US010288433B2

(12) United States Patent
Zheng et al.

(10) Patent No.: US 10,288,433 B2
(45) Date of Patent: May 14, 2019

(54) MAP-MATCHING FOR LOW-SAMPLING-RATE GPS TRAJECTORIES

(75) Inventors: Yu Zheng, Beijing (CN); Yin Lou, Shanghai (CN); Chengyang Zhang, Beijing (CN); Xing Xie, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 599 days.

(21) Appl. No.: 12/712,857

(22) Filed: Feb. 25, 2010

(65) Prior Publication Data

US 2011/0208426 A1  Aug. 25, 2011

(51) Int. Cl.
*G01C 21/26* (2006.01)
*G01C 21/30* (2006.01)

(52) U.S. Cl.
CPC .................................. *G01C 21/30* (2013.01)

(58) Field of Classification Search
USPC ......................................................... 701/208
See application file for complete search history.

(56) References Cited

U.S. PATENT DOCUMENTS

| | | |
|---|---|---|
| 5,428,546 A | 6/1995 | Shah et al. |
| 5,802,492 A | 9/1998 | DeLorme et al. |
| 5,845,227 A | 12/1998 | Peterson |
| 5,904,727 A | 5/1999 | Prabhakaran |
| 6,023,241 A | 2/2000 | Clapper |
| 6,091,359 A | 7/2000 | Geier |
| 6,091,956 A | 7/2000 | Hollenberg |
| 6,122,628 A | 9/2000 | Castelli et al. |
| 6,128,279 A | 10/2000 | O'Neil et al. |
| 6,219,662 B1 | 4/2001 | Fuh et al. |
| 6,243,647 B1 | 6/2001 | Berstis et al. |
| 6,317,684 B1 | 11/2001 | Roeseler et al. |
| 6,317,686 B1 | 11/2001 | Ran |
| 6,351,775 B1 | 2/2002 | Yu |
| 6,356,838 B1 | 3/2002 | Paul |
| 6,385,539 B1 | 5/2002 | Wilson et al. |
| 6,411,897 B1 | 6/2002 | Gaspard, II |
| 6,424,370 B1 | 7/2002 | Courtney |
| 6,427,122 B1 | 7/2002 | Lin |
| 6,430,547 B1 | 8/2002 | Busche et al. |

(Continued)

FOREIGN PATENT DOCUMENTS

| | | |
|---|---|---|
| EP | 1087605 A2 | 3/2001 |
| GB | 2421653 A | 6/2006 |

(Continued)

OTHER PUBLICATIONS

Borzsonyi, et al., The Skyline Operator, in Proc. ICDE 2001, IEEE Press: 421-430, <<http://ieeexplore.ieee.org/stamp/stamp.jsp?tp=8,arnumber=914855>>.

(Continued)

*Primary Examiner* — Abby Y Lin
*Assistant Examiner* — Kyung Kim
(74) *Attorney, Agent, or Firm* — Merchant & Gould

(57) ABSTRACT

This disclosure describes a map-matching module that supports a Global Positioning System (GPS) and provides a user with a best match trajectory corresponding to GPS sampling points taken at a low sampling rate. The best match trajectory is based upon a spatial-temporal analysis.

20 Claims, 11 Drawing Sheets

(56) References Cited

U.S. PATENT DOCUMENTS

| | | |
|---|---|---|
| 6,446,121 B1 | 9/2002 | Shah et al. |
| 6,493,650 B1 | 12/2002 | Rodgers et al. |
| 6,496,814 B1 | 12/2002 | Busche |
| 6,513,026 B1 | 1/2003 | Horvitz et al. |
| 6,516,272 B2 | 2/2003 | Lin |
| 6,553,310 B1 | 4/2003 | Lopke |
| 6,584,401 B2 | 6/2003 | Kirshenbaum et al. |
| 6,606,643 B1 | 8/2003 | Emens et al. |
| 6,611,881 B1 | 8/2003 | Gottfurcht et al. |
| 6,615,130 B2 | 9/2003 | Myr |
| 6,618,507 B1 | 9/2003 | Divakaran et al. |
| 6,625,319 B1 | 9/2003 | Krishnamachari |
| 6,724,733 B1 | 4/2004 | Schuba et al. |
| 6,732,120 B1 | 5/2004 | Du |
| 6,785,704 B1 | 8/2004 | McCanne |
| 6,816,779 B2 | 11/2004 | Chen et al. |
| RE38,724 E | 4/2005 | Peterson |
| 6,904,160 B2 | 6/2005 | Burgess |
| 6,919,842 B2 | 7/2005 | Cho |
| 6,925,447 B2 | 8/2005 | McMenimen et al. |
| 6,965,827 B1 | 11/2005 | Wolfson |
| 6,970,884 B2 | 11/2005 | Aggarwal |
| 6,981,055 B1 | 12/2005 | Ahuja et al. |
| 7,003,555 B1 | 2/2006 | Jungck |
| 7,013,290 B2 | 3/2006 | Ananian |
| 7,013,517 B2 | 3/2006 | Kropf |
| 7,031,517 B1 | 4/2006 | Le et al. |
| 7,062,562 B1 | 6/2006 | Baker et al. |
| 7,111,061 B2 | 9/2006 | Leighton et al. |
| 7,136,932 B1 | 11/2006 | Schneider |
| 7,152,118 B2 | 12/2006 | Anderson, IV et al. |
| 7,155,456 B2 | 12/2006 | Abbott, III et al. |
| 7,171,415 B2 | 1/2007 | Kan et al. |
| 7,194,552 B1 | 3/2007 | Schneider |
| 7,197,500 B1 | 3/2007 | Israni et al. |
| 7,203,693 B2 | 4/2007 | Carlbom et al. |
| 7,219,067 B1 | 5/2007 | McMullen et al. |
| 7,228,359 B1 | 6/2007 | Monteiro |
| 7,233,861 B2 | 6/2007 | Van Buer et al. |
| 7,239,962 B2 | 7/2007 | Plutowski |
| 7,281,199 B1 | 10/2007 | Nicol et al. |
| 7,284,051 B1 | 10/2007 | Okano et al. |
| 7,349,768 B2 | 3/2008 | Bruce et al. |
| 7,366,726 B2 | 4/2008 | Bellamy et al. |
| 7,389,283 B2 | 6/2008 | Adler |
| 7,395,250 B1 | 7/2008 | Aggarwal et al. |
| 7,428,551 B2 | 9/2008 | Luo et al. |
| 7,437,239 B2 | 10/2008 | Serre |
| 7,437,372 B2 | 10/2008 | Chen et al. |
| 7,447,588 B1 | 11/2008 | Xu et al. |
| 7,479,897 B2 | 1/2009 | Gertsch et al. |
| 7,493,294 B2 | 2/2009 | Flinn et al. |
| 7,519,690 B1 | 4/2009 | Barrow et al. |
| 7,548,936 B2 | 6/2009 | Liu et al. |
| 7,561,959 B2 | 7/2009 | Hopkins et al. |
| 7,574,508 B1 | 8/2009 | Kommula |
| 7,584,159 B1 | 9/2009 | Chakrabarti et al. |
| 7,584,301 B1 | 9/2009 | Joshi |
| 7,603,233 B2 | 10/2009 | Tashiro |
| 7,610,151 B2 | 10/2009 | Letchner et al. |
| 7,660,441 B2 | 2/2010 | Chen et al. |
| 7,685,422 B2 | 3/2010 | Isozaki et al. |
| 7,706,964 B2 | 4/2010 | Horvitz et al. |
| 7,707,314 B2 | 4/2010 | McCarthy et al. |
| 7,710,984 B2 | 5/2010 | Dunk |
| 7,739,040 B2 | 6/2010 | Horvitz |
| 7,801,842 B2 | 9/2010 | Dalton |
| 7,840,407 B2 | 11/2010 | Strope et al. |
| 7,860,891 B2 | 12/2010 | Adler et al. |
| 7,904,530 B2 | 3/2011 | Partridge et al. |
| 7,920,965 B1 | 4/2011 | Nesbitt et al. |
| 7,930,427 B2 | 4/2011 | Josefsberg et al. |
| 7,948,400 B2 | 5/2011 | Horvitz et al. |
| 7,982,635 B2 | 7/2011 | Seong |
| 7,984,006 B2 | 7/2011 | Price |
| 7,991,879 B2 | 8/2011 | Josefsberg et al. |
| 8,060,462 B2 | 11/2011 | Flinn et al. |
| 8,117,138 B2 | 2/2012 | Apte et al. |
| 8,135,505 B2 | 3/2012 | Vengroff et al. |
| 8,190,649 B2 | 5/2012 | Bailly |
| 8,219,112 B1 | 7/2012 | Youssef et al. |
| 8,275,649 B2 | 9/2012 | Zheng et al. |
| 8,458,298 B2 | 6/2013 | Josefsberg et al. |
| 8,562,439 B2 | 10/2013 | Shuman et al. |
| 8,577,380 B2 | 11/2013 | Frias Martinez et al. |
| 9,009,177 B2 | 4/2015 | Zheng et al. |
| 2001/0029425 A1 | 10/2001 | Myr |
| 2002/0032689 A1 | 3/2002 | Abbott, III et al. |
| 2002/0038360 A1 | 3/2002 | Andrews et al. |
| 2002/0044690 A1 | 4/2002 | Burgess |
| 2002/0052873 A1 | 5/2002 | Delgado et al. |
| 2002/0062193 A1 | 5/2002 | Lin |
| 2002/0077749 A1 | 6/2002 | Doi |
| 2002/0128768 A1* | 9/2002 | Nakano et al. ............... 701/202 |
| 2003/0053424 A1 | 3/2003 | Krishnamurthy et al. |
| 2003/0063133 A1 | 4/2003 | Foote et al. |
| 2003/0069893 A1 | 4/2003 | Kanai et al. |
| 2003/0069968 A1 | 4/2003 | O'Neil et al. |
| 2003/0139898 A1 | 7/2003 | Miller et al. |
| 2003/0140040 A1 | 7/2003 | Schiller |
| 2003/0195810 A1 | 10/2003 | Raghupathy et al. |
| 2003/0212689 A1 | 11/2003 | Chen et al. |
| 2003/0217070 A1 | 11/2003 | Gotoh et al. |
| 2003/0229697 A1 | 12/2003 | Borella |
| 2004/0039798 A1 | 2/2004 | Hotz et al. |
| 2004/0064338 A1 | 4/2004 | Shiota et al. |
| 2004/0073640 A1 | 4/2004 | Martin et al. |
| 2004/0117358 A1 | 6/2004 | von Kaenel et al. |
| 2004/0196161 A1 | 10/2004 | Bell et al. |
| 2004/0198386 A1 | 10/2004 | Dupray |
| 2004/0217884 A1 | 11/2004 | Samadani et al. |
| 2004/0220965 A1 | 11/2004 | Harville et al. |
| 2004/0264465 A1 | 12/2004 | Dunk |
| 2005/0004830 A1 | 1/2005 | Rozell et al. |
| 2005/0004903 A1 | 1/2005 | Tsuda |
| 2005/0031296 A1 | 2/2005 | Grosvenor |
| 2005/0075116 A1 | 4/2005 | Laird et al. |
| 2005/0075119 A1 | 4/2005 | Sheha et al. |
| 2005/0075782 A1 | 4/2005 | Torgunrud |
| 2005/0075784 A1 | 4/2005 | Gray et al. |
| 2005/0080554 A1 | 4/2005 | Ono et al. |
| 2005/0108261 A1 | 5/2005 | Glassy et al. |
| 2005/0131889 A1 | 6/2005 | Bennett et al. |
| 2005/0198286 A1 | 9/2005 | Xu et al. |
| 2005/0203927 A1 | 9/2005 | Sull et al. |
| 2005/0225678 A1 | 10/2005 | Zisserman et al. |
| 2005/0231394 A1 | 10/2005 | Machii et al. |
| 2005/0265317 A1 | 12/2005 | Reeves et al. |
| 2005/0278371 A1 | 12/2005 | Funk et al. |
| 2006/0020597 A1 | 1/2006 | Keating et al. |
| 2006/0036630 A1 | 2/2006 | Gray |
| 2006/0042483 A1 | 3/2006 | Work et al. |
| 2006/0075139 A1 | 4/2006 | Jungck |
| 2006/0085177 A1 | 4/2006 | Toyama et al. |
| 2006/0085419 A1 | 4/2006 | Rosen |
| 2006/0090122 A1 | 4/2006 | Pyhalammi et al. |
| 2006/0095540 A1 | 5/2006 | Anderson et al. |
| 2006/0101377 A1 | 5/2006 | Toyama et al. |
| 2006/0129675 A1 | 6/2006 | Zimmer et al. |
| 2006/0143442 A1 | 6/2006 | Smith |
| 2006/0149464 A1 | 7/2006 | Chien |
| 2006/0155464 A1 | 7/2006 | Smartt |
| 2006/0156209 A1 | 7/2006 | Matsuura et al. |
| 2006/0161560 A1 | 7/2006 | Khandelwal et al. |
| 2006/0164238 A1 | 7/2006 | Karaoguz et al. |
| 2006/0173838 A1 | 8/2006 | Garg et al. |
| 2006/0178807 A1 | 8/2006 | Kato et al. |
| 2006/0190602 A1 | 8/2006 | Canali et al. |
| 2006/0200539 A1 | 9/2006 | Kappler et al. |
| 2006/0212217 A1 | 9/2006 | Sheha et al. |
| 2006/0224303 A1 | 10/2006 | Hayashi |
| 2006/0224773 A1 | 10/2006 | Degenaro et al. |
| 2006/0247844 A1 | 11/2006 | Wang et al. |
| 2006/0251292 A1 | 11/2006 | Gokturk et al. |

(56) References Cited

U.S. PATENT DOCUMENTS

| | | | |
|---|---|---|---|
| 2006/0265125 A1* | 11/2006 | Glaza | 701/210 |
| 2006/0266830 A1 | 11/2006 | Horozov et al. | |
| 2007/0005419 A1 | 1/2007 | Horvitz et al. | |
| 2007/0006098 A1 | 1/2007 | Krumm et al. | |
| 2007/0016663 A1 | 1/2007 | Weis | |
| 2007/0038362 A1 | 2/2007 | Gueziec | |
| 2007/0041393 A1 | 2/2007 | Westhead et al. | |
| 2007/0064633 A1 | 3/2007 | Fricke | |
| 2007/0064715 A1 | 3/2007 | Lloyd et al. | |
| 2007/0088974 A1 | 4/2007 | Chandwani et al. | |
| 2007/0100776 A1 | 5/2007 | Shah et al. | |
| 2007/0118668 A1 | 5/2007 | McCarthy et al. | |
| 2007/0127833 A1 | 6/2007 | Singh | |
| 2007/0168208 A1 | 7/2007 | Aikas et al. | |
| 2007/0203638 A1 | 8/2007 | Tooyama et al. | |
| 2007/0226004 A1 | 9/2007 | Harrison | |
| 2008/0004789 A1 | 1/2008 | Horvitz et al. | |
| 2008/0004793 A1 | 1/2008 | Horvitz et al. | |
| 2008/0016051 A1 | 1/2008 | Schiller | |
| 2008/0016233 A1 | 1/2008 | Schneider | |
| 2008/0052303 A1 | 2/2008 | Adler et al. | |
| 2008/0059576 A1 | 3/2008 | Liu et al. | |
| 2008/0071465 A1 | 3/2008 | Chapman et al. | |
| 2008/0076451 A1 | 3/2008 | Sheha et al. | |
| 2008/0086574 A1 | 4/2008 | Raciborski et al. | |
| 2008/0098313 A1 | 4/2008 | Pollack | |
| 2008/0201074 A1 | 8/2008 | Bleckman et al. | |
| 2008/0201102 A1 | 8/2008 | Boettcher et al. | |
| 2008/0214157 A1 | 9/2008 | Ramer et al. | |
| 2008/0215237 A1 | 9/2008 | Perry | |
| 2008/0228396 A1 | 9/2008 | Machii et al. | |
| 2008/0228783 A1 | 9/2008 | Moffat | |
| 2008/0235383 A1 | 9/2008 | Schneider | |
| 2008/0268876 A1 | 10/2008 | Gelfand et al. | |
| 2008/0270019 A1 | 10/2008 | Anderson et al. | |
| 2008/0312822 A1 | 12/2008 | Lucas et al. | |
| 2008/0319648 A1 | 12/2008 | Poltorak | |
| 2008/0319660 A1 | 12/2008 | Horvitz et al. | |
| 2008/0319974 A1 | 12/2008 | Ma et al. | |
| 2009/0005987 A1 | 1/2009 | Vengroff et al. | |
| 2009/0019181 A1 | 1/2009 | Fang et al. | |
| 2009/0063646 A1 | 3/2009 | Mitnick | |
| 2009/0070035 A1 | 3/2009 | Van Buer | |
| 2009/0083128 A1 | 3/2009 | Siegel | |
| 2009/0083237 A1 | 3/2009 | Gelfand et al. | |
| 2009/0100018 A1 | 4/2009 | Roberts | |
| 2009/0138188 A1 | 5/2009 | Kores et al. | |
| 2009/0164516 A1 | 6/2009 | Svendsen et al. | |
| 2009/0213844 A1 | 8/2009 | Hughston | |
| 2009/0216435 A1 | 8/2009 | Zheng et al. | |
| 2009/0216704 A1 | 8/2009 | Zheng et al. | |
| 2009/0222581 A1 | 9/2009 | Josefsberg et al. | |
| 2009/0228198 A1 | 9/2009 | Goldberg et al. | |
| 2009/0239552 A1 | 9/2009 | Churchill et al. | |
| 2009/0282122 A1 | 11/2009 | Patel et al. | |
| 2009/0326802 A1 | 12/2009 | Johnson | |
| 2010/0004997 A1 | 1/2010 | Mehta et al. | |
| 2010/0010991 A1 | 1/2010 | Joshi | |
| 2010/0027527 A1 | 2/2010 | Higgins et al. | |
| 2010/0070171 A1 | 3/2010 | Barbeau et al. | |
| 2010/0076968 A1 | 3/2010 | Boyns et al. | |
| 2010/0082611 A1 | 4/2010 | Athsani et al. | |
| 2010/0111372 A1 | 5/2010 | Zheng et al. | |
| 2010/0153292 A1 | 6/2010 | Zheng et al. | |
| 2010/0279616 A1 | 11/2010 | Jin et al. | |
| 2010/0312461 A1 | 12/2010 | Haynie et al. | |
| 2011/0022299 A1 | 1/2011 | Feng et al. | |
| 2011/0029224 A1 | 2/2011 | Chapman et al. | |
| 2011/0130947 A1 | 6/2011 | Basir | |
| 2011/0173015 A1 | 7/2011 | Chapman et al. | |
| 2011/0176000 A1 | 7/2011 | Budge et al. | |
| 2011/0184949 A1 | 7/2011 | Luo | |
| 2011/0191011 A1 | 8/2011 | McBride et al. | |
| 2011/0191284 A1 | 8/2011 | Dalton | |
| 2011/0208419 A1 | 8/2011 | Boss et al. | |
| 2011/0280453 A1 | 11/2011 | Chen et al. | |
| 2011/0282798 A1 | 11/2011 | Zheng et al. | |
| 2011/0302209 A1 | 12/2011 | Flinn et al. | |
| 2012/0030029 A1 | 2/2012 | Flinn et al. | |
| 2012/0030064 A1 | 2/2012 | Flinn et al. | |
| 2012/0150425 A1 | 6/2012 | Chapman et al. | |
| 2012/0256770 A1 | 10/2012 | Mitchell | |
| 2013/0166188 A1 | 6/2013 | Zheng et al. | |
| 2014/0088791 A1 | 3/2014 | Alpert et al. | |
| 2015/0117713 A1 | 4/2015 | Zheng et al. | |
| 2015/0186389 A1 | 7/2015 | Zheng et al. | |
| 2016/0232179 A1 | 8/2016 | Zheng et al. | |
| 2017/0131110 A1 | 5/2017 | Zheng et al. | |

FOREIGN PATENT DOCUMENTS

| | | |
|---|---|---|
| JP | 2002140362 | 5/2002 |
| JP | 2002304408 A | 10/2002 |
| JP | 2003044503 A | 2/2003 |
| KR | 20050072555 A | 7/2005 |
| KR | 20060006271 A | 1/2006 |
| KR | 100650389 B1 | 11/2006 |
| WO | WO2006097907 A2 | 9/2006 |
| WO | WO2007087615 A | 8/2007 |
| WO | WO2007145625 A | 12/2007 |
| WO | WO2009053411 A1 | 4/2009 |
| WO | WO2010062726 A2 | 6/2010 |

OTHER PUBLICATIONS

Brauckhoff, et al., Applying PCA for Traffic Anomaly Detection: Problems and Solutions, IEEE, 2009, 5 pages.

Brkic, et al., Generative modeling of spatio-temporal traffic sign trajectories, Proceedings of the IEEE Conference on Computer Vision and Pattern Recognition, 2010, pp. 25-31, <<http://www.zemris.fer.hr/~ssegvic/pubs/brkic10ucvp.pdf>>.

Bu, et al., Efficient Anomaly Monitoring Over Moving Object Trajectory Streams, KDD 2009, ACM, 2009, 9 pages.

Chen, et al., GLS-SOD: A Generalized Local Statistical Approach for Spatial Outlier Detection, Proceedings of KDD 2010, ACM, 2010, pp. 1069-1078.

Cranshaw, et al., Bridging the Gap between the Physical Location and Online Social Networks, In Proc. Ubicomp 2010, ACM Press (2010), <<http://www.eng.tau.ac.il/~eran/papers/Cranshaw_Bridging_the_Gap.pdf>>.

Das, et al., Anomaly Detection and Spatial-Temporal Analysis of Global Climate System, Proceedings of SensorKDD 2009, 9 pages, 2009 ACM.

Eagle, et al., Community Computing: Comparisons between Rural and Urban Societies using Mobile Phone Data, IEEE Social Computing, 144-150, <<http://reality.media.mit.edu/pdfs/Eagle_community.pdf>>.

Eagle, et al., Reality mining: sensing complex social systems. Personal Ubiquitous Computing, 10, 4: 255-268, 2006. <<http://robotics.usc.edu/~sameera/CS546/readings/eagle_uc2006.pdf>>.

Estkowski, No Steiner Point Subdivision Simplification is NP-Complete, In Proceedings of the 10th Canadian Conference on Computational Geometry, pp. 11-20, 1998.

Ge, et al., An Energy-Efficient Mobile Recommender System. In Proc. KDD 2010, ACM Press 2010, <<http://pegasus.rutgers.edu/~kelixiao/papers/An%020Energy-Efficient%20Mobile%20Recommender%20System.pdf>>.

Ge, et al., Top-Eye: Top-k Evolving Trajectory Outlier Detection, Proceedings of CIKM 2010, Toronto, Canada, 4 pages.

Guehnemann, et al., Monitoring traffic and emissions by floating car data. Institute of transport studies Australia; 2004, <<http://elib.dlr.de/6675/1/its_wp_04-07.pdf>>.

Hirose, et al., Network Anomaly Detection based on Eigen Equation Compression, In Proceedings of the 15th SIGKDD Conference on Knowledge Discovery and Data Mining, pp. 1185-1194, 2009 ACM. <<http://www.ibis.t.u-tokyo.ac.jp/yamanishi/ID361_Network_Anomaly_Detection.pdf>>.

(56) References Cited

OTHER PUBLICATIONS

Kindberg, et al., Urban computing. Pervasive computing. IEEE Computer Society. 6, 3, pp. 18-20. Aug. 2007, <<http://ieeexplore.ieee.org/stamp/stamp.jsp?tp=&arnumber=4287439&userType=inst>>.

Kostakos, et al., Urban computing to bridge online and real-world social networks. Handbook of Research on Urban Informatics, 2008, <<http://hci.uma.pt/courses/ubicomp/papers/social/kostakos-08.pdf>>.

Lakhina, et al., Diagnosing Network-Wide Traffic Anomalies, In Proceedings of the SIGCOMM 2004 Conference, 12 pages, 2004 ACM.

Lee, et al., Trajectory Clustering: A Partition-and-group Framework, In Proceedings of the 26th ACM SIGMOD International Conference on Management of Data 2007, pp. 593-604, 2007.

Li, et al., Temporal Outlier Detection in Vehicle Traffic Data, Proceedings of the 2009 IEEE International Conference on Data Engineering, pp. 1319-1322, <<http://www.cs.uiuc.edu/~hanj/pdf/icde09_xli.pdf>>.

Liao, et al., Anomaly Detection in GPS Data Based on Visual Analytics, Proceedings of the 2010 IEEE Symposium, Oct. 2010, pp. 51-58, <<http://web.siat.ac.cn/~baoquan/papers/GPSvas.pdf>>.

Lippi, et al., Collective Traffic Forecasting, Proceedings of the European Conference on Machine Learning and Principles and Practice of Knowledge Discovery Database, ECML PKDD 2010, pp. 259-273, 2010.

Liu, et al., Uncovering cabdrivers' behavior patterns from their digital traces, Computers, Environment and Urban Systems, 2010.

Lozano, et al., Spatial-temporal Causal Modeling for Climate Change Attribution, KDD 2009, Paris France, ACM 2009, 10 pages.

Nzouonta, et al, VANET Routing on City Roads using Real-Time Vehicular Traffic Information, IEEE Transactions on Vehicular Technology, vol. 58, No. 7, Sep. 2009, <<http://web.njitedu/~gwang/publications/TVT09.pdf>>.

Pelekis, et al., Unsupervised Trajectory Sampling, Proceedings of the European Conference on Machine Learning and Principles and Practice of Knowledge Discovery in Databases ECML PKDD 2010, pp. 17-33, 2010.

Ringberg, et al., Sensitivity of PCA for Traffic Anomaly Detection, SIGMETRICS 2007, pp. 109-120.

Rosenfeld, Connectivity in digital pictures. Journal of the ACM (JACM), 17(1):160, 1970.

Rosenfeld, Connectivity in digital pictures, Journal of the ACM 17 (1): pp. 146-160, 1970.

Shekhar, et al., Unified approach to detecting spatial outliers, University of Helsinki 2007, 27 pages, <<http://www.cs.helsinki.fi/u/leino/opetus/spatial-k07/maksimainen.pdf>>.

Shklovski, et al., Urban Computing-Navigating Space and Context. IEEE Computer Society. 39 ,9, pp. 36-37, 2006 <<http://www.itu.dk/people/irsh/pubs/UrbanComputingIntro.pdf>>.

Sun, et al., On Local Spatial Outliers, Technical Report No. 549, Jun. 2004, <<http://sydney.edu.au/engineering/it/research/tr/tr549.pdf>>, 9 pages.

Wu, et al., Spatio-Temporal Outlier Detection in Precipitation Data, Knowledge Discovery from Sensor Data, pp. 115-133, 2010, <<http://sydney.edu.au/engineering/it/~ewu1/publications/WuLiuChawlaSensorKDD2008.pdf>>.

Yan, et al., Discovery of frequent substructures, Wiley-Interscience, 2007, 99-113.

Yuxiang, et al., Detecting Spatio-temporal Outliers in Climate Dataset: A Method Study, IEEE 2005, pp. 760-763.

Zhang, et al., iBAT: Detecting Anomalous Taxi Trajectories from GPS Traces, Proceedings of UbiComp Sep. 2011, 10 pages.

Zhang, et al., Network Anomography, USENIX Association, Internet Measurement Conference 2005, pp. 317-330.

Zheng, et al., GeoLife: A Collaborative Social Networking Service among User, Location and Trajectory. IEEE Date Engineer Bulletin, 33(2). IEEE press 2010, 32-40, <<http://sites.computer.org/debull/A10june/geolife.pdf>>.

Zheng, et al., Recommending friends and locations based on individual location history. In ACM Transaction on the Web, 2011, 44 pages, <<http://research.microsoft.com/pubs/122435/RecomFriend-zheng-Published.pdf>>.

Zheng, et al., T-Drive: Driving Directions based on Taxi Trajectories, In Proc. ACM SIGSPATIAL GIS 2010. ACM Press , 2010, 10 pages, <<http://www.cse.unt.edu/~huangyan/6350/paperList/T-Drive.pdf>>.

Ziebart, et al., Navigate like a cabbie: Probabilistic reasoning from observed context-aware behavior. In Proc. Ubicomp 2008, pp. 322-331, <<http://citeseerx.ist.psu.edu/viewdoc/download?doi=10.1.1.141.7187&rep=rep1&type=pdf>>.

Office Action for U.S. Appl. No. 12/037,347, mailed on Aug. 17, 2011, Yu Zheng, "System for Logging Life Experiences Using Geographic Cues", 9 pgs.

Office Action for U.S. Appl. No. 12/711,130, mailed on Oct. 4, 2012, Zheng et al., "Mining Correlation Between Locations Using Location History", 15 pages.

Office Action for U.S. Appl. No. 12/353,940, mailed on Nov. 2, 2012, Zheng et al., "Detecting Spatial Outliers in a Location Entity Dataset", 11 pages.

Office Action for U.S. Appl. No. 12/794,538, mailed on Nov. 29, 2011, Zheng et al. "Searching Similar Trajectories by Locations", 10 pages.

Shekhar et al., "A Unified Approach to Detecting Spatial Outliers", GeoInformatica, 7:2, Jun. 2003, pp. 139-166.

Sun, "Outlier Detection in High Dimensional, Spatial and Sequential Data Sets", School of Information Technologies, The University of Sydney, Sep. 2006, 118 pages.

Tai et al., "Recommending Personalized Scenic Itinerary with Geo-Tagged Photos", ICME, Jun. 2008, pp. 1209-1212.

8.10 Domain Name System (DNS), retrieved on Apr. 29, 2008 at <<http://www.unix.org.ua/orelly/networking/firewall/ch08_10.htm>>, Unix, pp. 1-11.

Domain Name System (DNS) A Guide to TCP/IP, retrieved on Apr. 29, 2008 at <<http://web.syr.edu/~djmolta/ist452/ch_07.ppt>>, Thomson Learning Course Technology, pp. 1-56.

Espinoza et al, "GeoNotes: Social and Navigational Aspects of Location-Based Information Systems", Proc Ubicomp 3rd Intl Conf on Ubiquitous Computing, Oct. 2001, LNCS 2201, pp. 2-17.

Eustice et al, "The Smart Party: A Personalized Location Aware Multimedia Experience", Consumer Communications and Networking Conf, Jan. 2008, 5 pgs.

"Flow Control Platform (FCP) Solutions", retrieved on Jul. 5, 2007, at <<http://k2colocation.com/network-services/fcp.cfm>>, K2 Colocation, 2005, 2 pgs.

"Global Server Load Balancing for Disaster Recovery, Business Continuity, Performance Optimization and Datacenter Management", Zeus Technology Limited, retrieved at <<http://www.zeus.com/documents/en/ZXT/ZXTM_Global_Load_Balancer.pdf>>, Zeus Technology Limited, 1995-2007, 4 pgs.

GPS Sharing, retrieved Feb. 4, 2013 at http://web.archive.org/web/20071129224158/http://gpssharing.com, 2 pgs.

Hariharan et al, "NetTrust—Recommendation System for Embedding Trust in a Virtual Realm", ACM Recommender Systems, Oct. 2007, 6 pgs.

International Search Report for PCT/US2009/063023 (WO 2010/062726), mailed Jun. 10, 2010, 4 pgs.

Jarvelin et al, "Cumulated Gain Based Evaluation of IR Techniques", ACM Transactions on Information Systems, vol. 20, No. 4, Oct. 2002, pp. 422-446.

Jones et al, "P3 Systems: Putting the Place Back into Social Networks", IEEE Internet Computing, Sep.-Oct. 2005, pp. 38-46.

Lee et al, "Efficient Mining of User Behaviors by Temporal Mobile Access Patterns", IJCSNS International Journal of Computer Science and Network Security, vol. 7, No. 2, Feb. 2007, pp. 285-291.

Linden et al, "Amazon.com Recommendations, Item to Item Collaborative Filtering", IEEE Internet Computing, Jan. and Feb. 2003, pp. 76-80.

Linden, "The End of Federated Search?", at <<http://glinden.blogspot.com/2007/03/end-of-federated-search.html>>, Mar. 24, 2007, pp. 9.

(56) References Cited

OTHER PUBLICATIONS

Matsuo et al, "Inferring Long Term User Properties Based on Users' Location History", Proc 20th Intl Joint Conf on Artificial Intelligence, Jan. 2007, pp. 2159-2165.
McDonald et al, "Expertise Recommender: A Flexible Recommendation System and Architecture", CSCW 2000, Dec. 2000, pp. 231-240.
Michael et al, "Location Based Intelligence—Modeling Behavior in Humans Using GPS", Proc Intl Symposium on Technology and Society, Jun. 2006, 8 pgs.
Office Action for U.S. Appl. No. 12/041,599, mailed on Jul. 25, 2011, Arne Josefsberg, "Failover in an Internet Location Coordinate Enhanced Domain Name System".
Office Action for U.S. Appl. No. 13/324,758, mailed on Jan. 18, 2013, Zheng et al., "Urban Computing of Route-Oriented Vehicles", 48 pages.
Office Action for U.S. Appl. No. 13/188,013, mailed on Nov. 15, 2011, Josefsberg et al., "Internet Location Coordinate Enhanced Domain Name System", 14 pages.
Office Action for U.S. Appl. No. 12/353,940, mailed on Feb. 28, 2013, Zheng et al., "Detecting Spatial Outliers in a Location Entity Dataset", 9 pages.
Office Action for U.S. Appl. No. 12/041,599, mailed on Feb. 9, 2012, Arne Josefsberg, "Failover in an Internet Location Coordinate Enhanced Domain Name System", 27 pgs.
Office Action for U.S. Appl. No. 12/041,599, mailed on Sep. 21, 2012, Josefsberg et al., "Failover in an Internet Location Coordinate Enhanced Domain Name System", 9 pages.
Park, et al., "CoDNS: Improving DNS Performance and Reliability via Cooperative Lookups," retrieved at <<http://www.cs.princeton.edu/nsg/papers/codns_osdi_04/paper.pdf>>, Princeton University, OSDI'04: Proceedings of the 6th conference on Symposium on Opearting Systems Design \& Implementation, Dec. 2004, pp. 1-16.
Sarwar et al, "Application of Dimensionality Reduction in Recommender System, A Case Study", ACM WebKDD Workshop, Aug. 2000, 12 pgs.
Spertus et al, "Evaluating Similarity Measures: A Large Scale Study in the Orkut Social Network", Proc 11th ACM SIGKDD Intl Conf on Knowledge Discovery in Data Mining, Aug. 2005, 7 pgs.
Wikipedia, "Operating System", retrived from <<http://en.wikipedia.org/wiki/Operating_system>> on Oct. 8, 2010, 1 pg.
Xie, "Understanding User Behavior Geospatially", Microsoft Research, Nov. 2008, 2 pgs.
Yegulalp, "Change the Windows 2000 DNS cache," retrieved on Apr. 29, 2008 at <<http://searchwincomputing.techtarget.com/tip/0,289483,sid68_gci1039955,00.html>>, SearchWinComputing.com, Aug. 21, 2002, 3 pgs.
Min-qi, et al., "An Algorithm for Spatial Outlier Detection Based on Delaunay Triangulation", In the Proceedings of the 2008 International Conference on Computational Intelligence and Security, Dec. 2008, pp. 102-107.
Office Action for U.S. Appl. No. 12/353,940, mailed on Mar. 23, 2012, Yu Zheng, "Detecting Spatial Outliers in a Location Entity Dataset", 6 pgs.
Office Action for U.S. Appl. No. 12/773,771, mailed on Mar. 26, 2012, Yu Zheng, "Collaborative Location and Activity Recommendations", 9 pgs.
Office Action for U.S. Appl. No. 12/711,130, mailed on Mar. 27, 2012, Yu Zheng, "Mining Correlation Between Locations Using Location History", 14 pgs.
Office Action for U.S. Appl. No. 12/567,667, mailed on Jul. 18, 2012, Zheng et al., "Recommending Points of Interests in a Region", 20 pages.
Office Action for U.S. Appl. No. 12/712,053, mailed on Aug. 15, 2012, Zheng et al., "Route Computation Based on Route-Oriented Vehicle Trajectories", 17 pages.
Shekhar, et al., "Data Mining for Selective Visualization of Large Spatial Datasets", In the Proceedings of the 14th IEEE International Conference on Tools with Artificial Intelligence, Nov. 2002, pp. 41-48.

Zhang, et al., "A Taxonomy Framework for Unsupervised Outlier Detection Techniques for Multi-Type Data Sets," Technical Report TR-CTIT-07-79, Centre for Telematics and Information Technology University of Twente, Enschede, Nov. 2007, pp. 1-40.
European Search Report mailed Nov. 21, 2012 for European Patent Application No. 09714738.3, 9 pages.
Office Action for U.S. Appl. No. 12/567,667, mailed on Dec. 19, 2012, Zheng et al., "Recommending Points of Interests in a Region", 18 pages.
Shiraishi, "A User-centric Approach for Interactive Visualization and Mapping of Geo-sensor Data", Networked Sensing Systems, 2007, INSS, Fourth International Conference on IEEE, Jun. 1, 2007, pp. 134-137.
Spinellis, "Position-Annotated Photographs: A Geotemporal Web", IEEE Pervasive Computing IEEE Service Center, Los Alamintos, CA, vol. 2, No. 2, Apr. 1, 2003, pp. 72-79.
Wang et al., "Spatiotemporal Data Modelling and Management: a Survey", Technology of Object-Oriented Languages and Systems, 2000, ASI, Proceedings of the 36th International Conference on Oct. 30-Nov. 4, 2000, IEEE, pp. 202-211.
Weng et al., "Design and Implementation of Spatial-temporal Data Model in Vehicle Monitor-System", Proceeding of the 8th International Conference on Geocomputation, Aug. 3, 2005, pp. 1-8.
Abowd et al., "Cyberguide: A mobile context-aware tour guide", Wireless Networks, vol. 3, retrieved on Apr. 30, 2010 at <<http://graphics.cs.columbia.edu/courses/mobwear/resources/p421-abowd-97.pdf>>, Oct. 1997, pp. 421-433.
Adomavicius, Tuzhilin, "Toward the Next Generation of Recommender Systems: A Survey of the State-of-the-Art and Possible Extensions", retrieved on Dec. 29, 2009 at <<http://www.inf.unibz.it/~ricci/ATIS/papers/state-of-the-art-2005.pdf>>, IEEE Transactions on Knowledge and Data Engineering, vol. 17, No. 6, Jun. 2005, pp. 734-749.
Agrawal, et al., "Mining Association Rules between Sets of Items in Large Databases", retrieved on Aug. 4, 2009 at <<http://rakesh.agrawal-family.com/papers/sigmod93assoc.pdf>>, ACM, Proceedings of SIGMOD 1993, Jun. 1993, pp. 207-216.
Agrawal, et al., "Mining Sequential Patterns", retrieved on Aug. 4, 2009 at <<http://www.almaden.ibm.com/cs/projects/iis/hdb/Publications/papers/icde95.ps.gz>>, Proceedings of ICDE 1995, Mar. 1995, 12 pgs.
Aizawa, et al., "Capture and Efficient Retrieval of Life Log", available at least as early as Nov. 16, 2007, at <<http://www.ii.ist.i.kyoto-u.ac.jp/~sumi/pervasive04/program/Aizawa.pdf>>, In Pervasive 2004 Workshop on Memory and Sharing of Experiences, Apr. 2004, 6 pgs.
Aizawa, "Digitizing Personal Experiences: Capture and Retrieval of Life Log", at <<http://ieeexplore.ieee.org/iel5/9520/30168/01385968.pdf?arnumber=1385968 >>, Proceedings of the 11th International Multimedia Modelling Conference (MMM'05), Jan. 2005, pp. 1 (abstract).
Allen, "Dredging-up the Past: Lifelogging, Memory and Surveillance", retrieved at <<http://lsr.nellco.org/cgi/viewcontent.cgi?article=1177&context=upenn/wps>>, University of Pennsylvania Law School, 2007, pp. 50.
Amato, et al., "Region Based Image Similarity Search Inspired by Text Search", Third Italian Research Conference on Digital Library Systems, Padova, Italy, Jan. 29-30, 2007, pp. 78-85.
Ankerst et al., "OPTICS: Ordering Points to Identify the Clustering Structure", Proceedings of the ACM SIGMOD 1999 International Conference on Management of Data, Philadelphia, Pennsylvania, retrieved Apr. 30, 2010 at <<http://www.dbs.informatik.uni-muenchen.de/Publicationen/Papers/OPTICS.pdf>>, Jun. 1-3, 1999, 12 pages.
Belussi, et al, "Estimating the Selectivity of Spatial Queries Using the 'Correlation' Fractal Dimension", retrieved on Apr. 15, 2010 at <<http://www.vldb.org/conf/1995/P299.pdf>>, Proceedings of Conference on Very Large Data Bases (VLDB), Sep. 1995, pp. 299-310.
"Bikely Reviews", website, 2010, 1 page, retrieved on Apr. 16, 2010 at <<http://www.bikely.com/>>.
Bohm, "A Cost Model for Query Processing in High Dimensional Data Spaces", retrieved on Apr. 15, 2010 at <<http://www.dbs.

(56) References Cited

OTHER PUBLICATIONS informatik.uni-muenchen.de/~boehm/publications/tods-modeling. final.pdf>>, ACM Transactions on Database Systems, Jun. 2000, pp. 1-43.

Brunato, Battiti, "A Location-Dependent Recommender System for the Web", retrieved on Dec. 29, 2009 at <<http://dit.unitn.it/~brunato/pubblicazioni/MobEA.pdf>>, MobEA Workshop, Budapest, May 2003, pp. 1-5.

Cai, "Indexing Spatio-Temporal Trajectories with Chebyshev Polynomials", retrieved on Apr. 15, 2010 at <<http://www.cs.ubc.ca/~rng/psdepository/sigmod2004.pdf>>, ACM, Conference on Management of Data, Jun. 13-18, 2004, pp. 599-610.

Cao, et al., "Mining Frequent Spatio-temporal Sequential Patterns", retrieved on Aug. 4, 2009 at <<http://i.cs.hku.hk/~nikos/icdm05.pdf>>, IEEE Computer Society, ICDM 2005, Nov. 2005, pp. 82-89.

Chan, et al, "Efficient Time Series Matching by Wavelets", retrieved on Apr. 15, 2010 at <<http://infolab.usc.edu/csci599/Fall2003/Time%20Series/Efficient%20Time%20Series%20Matching%20by%20Wavelets.pdf>>, IEEE Computer Society, Proceedings of Conference on Data Engineering (ICDE), Mar. 1999, pp. 126-133.

Chen et al., "GeoTV: Navigating Geocoded RSS to Create an IPTV Experience", Proceedings of the 16th International World Wide Web Conference (WWW 2007), Banff, Alberta, Canada, May 8-12, 2007, pp. 1323-1324, retrieved Apr. 30, 2010 at <<http://www2007.org/posters/poster1042.pdf>>.

Chen, et al, "On the Marriage of Lp-norms and Edit Distance", retrieved on Apr. 15, 2010 at <<http://www.google.co.in/url?sa=t&source=web&ct=res&cd=3&ved=0CBEQFjAC&url=http%3A%2F%2Fciteseerx.ist.psu.edu%2Fviewdoc%2Fdownload%3Fdoi%3D10.1.1.1.7443%26rep%3Drep1%26type%3Dpdf&rct=j&q=On+the+marriage+of+lp+norms+and+edit+distance&ei=_ezGS621E439_Aa1qlzZDA&usg=AFQjCNHFZScVkE4uy1b_oC-Pr4ur7KIBdQ>>, Proceedings of Conference on Very Large Data Bases (VLDB), Aug. 29-Sep. 3, 2004, pp. 792-803.

Chen, et al, "Robust and Fast Similarity Search for Moving Object Trajectories", retrieved on Apr. 15, 2010 at <<http://citeseerx.ist.psu.edu/viewdoc/download;jsessionid=2C0EAC347F5F144727996F29CEFD49FB?doi=10.1.1.94.8191&rep=rep1&type=pdf>>, ACM, Conference on Management of Data, Jun. 2005, pp. 491-502.

Chen et al., "Searching Trajectories by Locations—An Efficiency Study", 2010 Microsoft Research, to be presented at the ACM Conference on Management of Data (SIGMOD), Indianapolis, Indiana, Jun. 6-11, 2010, 12 pages, retrieved on Apr. 16, 2010 at <<http://www.itee.uq.edu.au/~zxf/_papers/sigmod299-chen.pdf>>.

Datta, et al., "Image Retrieval: Ideas, Influences, and Trends of the New Age", ACM Computing Surveys, vol. 40, No. 2, Article 5, Apr. 2008, pp. 1-60.

Deerwester, et al., "Indexing by Latent Semantic Analysis", J. Amer. Soc. Info. Sci., vol. 41, No. 6, Jan. 1990, 34 pages.

Ding et al, "Querying and Mining of Time Series Data: Experimental Comparison of Representations and Distance Measures", retrieved on Apr. 15, 2010 at <<http://www.vldb.org/pvldb/1/1454226.pdf>>, VLDB Endowment, PVLDB'08, Aug. 23-28, 2008, pp. 1542-1552.

Dubuisson et al., "A Modified Hausdorff Distance for Object Matching", Proceedings of the 12th IAPR International Conference on Pattern Recognition, Computer Vision & Image Processing, vol. 1, Oct. 9-13, 1994, pp. 566-568.

Eagle et al, "Reality mining: sensing complex social systems", Springer-Verlag London, Personal and Ubiquitous Computing, vol. 10, Issue 4, Mar. 2006, pp. 255-268.

Estivill-Castro et al, "Data Mining Techniques for Autonomous Exploration of Large Volumes of Geo-referenced Crime Data", 6th International Conference on GeoCom.putation, University of Queensland, Brisbane, Australia, Sep. 24-26, 2001, 12 pages.

Faloutsos et al, "Fast Subsequence Matching in Time-Series Databases," Proceedings of the 1994 ACM SIGMOD International Conference on Management of Data, vol. 23, No. 2, Jun. 1994, 11 pgs.

Frentzos et al, "Algorithms for Nearest Neighbor Search on Moving Object Trajectories", retrieved on Apr. 15, 2010 at <<http://infolab.cs.unipi.gr/pubs/journals/FGPT06-Geoinformatica.pdf>>, Kluwer Academic Publishers, Geoinformatica, vol. 11, No. 2, Jun. 2007, pp. 1-32.

Frentzos et al, "Index-based Most Similar Trajectory Search", retrieved on Apr. 15, 2010 at <<http://isl.cs.unipi.gr/pubs/TR/UNIPI-ISL-TR-2006-01.pdf>>, IEEE Conference on Data Engineering (Technical Report UNIPI-ISL-TR-2006-01), Jun. 2006, pp. 1-12.

Giannotti, et al., "Efficient Mining of Temporally Annotated Sequences", retrieved on Aug. 4, 2009 at <<http://www.siam.org/meetings/sdm06/proceedings/032giannottif.pdf>>, Proceedings of the Sixth SIAM Intl Conference on Data Mining, Apr. 2006, pp. 346-357.

Giannotti, et al., "Trajectory Pattern Mining", retrieved on Aug. 4, 2009 at <<http://cs.gmu.edu/~jessica/temp/p330-giannotti.pdf>>, ACM, KDD'07, Aug. 2007, pp. 330-339.

Gonzalez, Hidalgo, Barabasi, "Understanding individual human mobility patterns Supplementary Material", retrieved on Dec. 29, 2009 at <<http://www.barabasilab.com/pubs/CCNR-ALB_Publications/200806-05_Nature-MobilityPatterns/200806-05_Nature-MobilityPatterns-SuppMat13.pdf>>, Nature, vol. 453, 2008, pp. 779-782.

"GPS Track Route Exchange Forum", 2010 GPSXchange.com website, 3 pages, retrieved on Apr. 16, 2010 <<http://www.gpsxchange.com/phpBB2/index.php>>.

"GPS-Waypoints", retrieved on Apr. 15, 2010 at <<http://www.gps-waypoints.net/>>, 2010, pp. 1.

Gustavsen, "Condor—an application framework for mobility-based context-aware applications", retrieved on Aug. 4, 2009 at <<http://www.comp.lancs.ac.uk/~dixa/conf/ubicomp2002-models/pdf/Gustavsen-goteborg%20sept-02.pdf>>, UBICOMP 2002, 2002, pp. 1-6.

Guttman, "R-Trees: A Dynamic Index Structure for Spatial Searching", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.66.1675%26rep%3Drep1%26type%3Dpdf&rct=j&q=R-trees%3A+a+dynamic+index+structure+for+spatial+searching&ei=JfTGS6uRPJH0_AaCpICHDQ&usg=AFQjCNFtQttNVHCKYJQZcH052-KmCxIZ0g>>, ACM, Proceedings of Conference on Management of Data,1984, pp. 47-57.

Han, et al., "Frequent pattern mining: current status and future directions", retrieved on Aug. 4, 2009 at <<http://www.springerlink.com/content/9p5633hm18x55867/fulltext.pdf>>, Springer Science+Business Media, LLC, 2007, pp. 55-86.

Hjaltason, Samet, "Distance Browsing in Spatial Databases", retrieved on Apr. 15, 2010 at <<http://citeseerx.ist.psu.edu/viewdoc/download?doi=10.1.1.25.4224&rep=rep1&type=pdf>>, ACM Transactions on Database Systems, vol. 24, No. 2, Jun. 1999, pp. 265-318.

Horozov et al., "Using Location for Personalized POI Recommendations in Mobile Environments", Proceedings of the 2006 International Symposium on Applications and the Internet (SAINT 2006), Phoenix, Arizona, Jan. 23-27, 2006, pp. 124-129.

Huang, Shekhar, Xiong, "Discovering Co-location Patterns from Spatial Datasets: A General Approach", retrieved on Dec. 29, 2009 at <<http://www.spatial.cs.umn.edu/paper_ps/coloc-tkde.pdf>>, IEEE Transactions on Knowledge and Data Engineering, vol. 16, Issue 12, Dec. 2004, pp. 1472-1485.

Huang, et al., "Project Report (draft version) Spatial Outlier Detection", retrieved on Dec. 12, 2008 at <<http://www-users.cs.umn.edu/~joh/csci8715/P6.pdf>>, Computer Science Department, University of Minnesota, 2004, pp. 1-8.

Jan, Horowitz, Peng, "Using GPS Data to Understand Variations in Path Choice", retrieved on Apr. 15, 2010 at <<https://pantherfile.uwm.edu/horowitz/www/pathchoice.pdf>>, National Research Council, Transportation Research Record 1725, 2000, pp. 37-44.

Kanoulas, Du, Xia, Zhang, "Finding Fastest Paths on a Road Network with Speed Patterns", retrieved on Dec. 24, 2009 at <<http://www.inf.unibz.it/dis/teaching/SDB/paper/kanoulasDXZ_icde06_fastestpath.pdf>>, IEEE Computer Society, Proceedings of Conference on Data Engineering (ICDE), 2006, pp. 1-10.

(56) References Cited

OTHER PUBLICATIONS

Kavouras, et al., "A Method for the Formalization and Integration of Geographic Categorizations", Draft version from the International Journal of Geographic Information Science, vol. 16, No. 5, 2002, pp. 439-453.
Ke, et al., "Correlated Pattern Mining in Quantitative Databases", ACM Transactions on Database Systems, vol. V, No. N, Apr. 2008, 44 pages.
Ke, et al., "Efficient Correlations Search from Graph Databases", IEEE Transactions on Knowledge and Data Engineering, vol. 20, Issue 12, Dec. 2008, pp. 1601-1615.
Kharrat, Popa, Zeitouni, Faiz, "Clustering Algorithm for Network Constraint Trajectories", retrieved on Apr. 15, 2010 at <<http://www.prism.uvsq.fr/~karima/papers/SDH_08.pdf>>, Springer Berlin, Symposium on Spatial Data Handling (SDH), 2008, pp. 631-647.
Korn, Pagel, Faloutsos, "On the 'Dimensionality Curse' and the 'Self-Similarity Blessing'", retrieved on Apr. 15, 2010 at <<http://www.informedia.cs.cmu.edu/documents/korn_dimcurse_2001.pdf>>, IEEE Educational Activities Department, Transactions on Knowledge and Data Engineering, vol. 13, No. 1, Jan. 2001, pp. 96-111.
Kou, et al., "Spatial Weighted Outlier Detection", retrieved on Dec. 12, 2008 at <<http://www.siam.org/proceedings/datamining/2006/dm06_072kouy.pdf>>, SIAM Conference on Data Mining, 2006, pp. 614-618.
Krumm, et al., "LOCADIO: Inferring Motion and Location from Wi-Fi Signal Strengths", retrieved on Aug. 4, 2009 at <<http://research.microsoft.com/en-us/um/people/horvitz/locadio.pdf>>, Proceedings of Mobiquitous 2004, 2004, pp. 4-13.
Krumm, et al., "Predestination: Inferring Destinations from Partial Trajectories", retrieved on Aug. 4, 2009 at <<http://research.microsoft.com/en-us/um/people/horvitz/predestination.pdf>>, UBICOMP 2006, 2006, pp. 1-18.
Krumm, et al., "Predestination: Where Do You Want to Go Today?", retrieved on Aug. 4, 2009 at <<http://research.microsoft.com/en-us/um/people/horvitz/predestination-ieee.pdf>>, IEEE Computer Magazine, vol. 40, No. 4, Apr. 2007, pp. 105-107.
Lavondes, et al., "Geo::PostalAddress—Country-specific postal address parsing/formatting", retrieved on Dec. 16, 2008 at <<http://search.cpan.org/~pauamma/Geo-PostalAddress-0.04/PostalAddress.pm>>, CPAN, 2004, pp. 1-8.
Lee, et al., "TraClass: Trajectory Classification Using Hierarchical Region-Based and Trajectory-Based Clustering", retrieved on Aug. 4, 2009 at <<http://www.cs.uiuc.edu/homes/hanj/pdf/vldb08_jglee.pdf>>, ACM, VLDB 2008, vol. 1, Issue 1, 2008, pp. 1081-1094.
Lee, et al., "Trajectory Clustering: A Partition-and-Group Framework", retrieved on Aug. 4, 2009 at <<http://www.cs.uiuc.edu/homes/hanj/pdf/sigmod07_jglee.pdf>>, ACM, SIGMOD 2007, 2007, pp. 1-12.
Lee, et al., "Trajectory Outlier Detection: A Partition-and-Detect Framework", retrieved on Aug. 4, 2009 at <<http://www.cs.uiuc.edu/homes/hanj/pdf/icde08_jaegil_lee.pdf>>, IEEE Computer Society, ICDE 2008, 2008, pp. 1-10.
Lemire, Maclachlan, "Slope One Predictors for Online Rating-Based Collaborative Filtering", retrieved on Dec. 29, 2009 at <<http://www.daniel-lemire.com/fr/documents/publications/lemiremaclachlan_sdm05.pdf>>, SIAM Proceedings of Data Mining (SDM), 2005, pp. 1-5.
Li et al., "Mining User Similarity Based on Location History", ACM Conference on Advances in Geographic Information Systems (ACM GIS 2008), Irvine, California, Nov. 5-7, 2008, Article 34, 10 pages, retrieved on Apr. 16, 2010 at <<http://research.microsoft.com/pubs/74369/Mining%20user%20similarity%20based%20on%20location%20history.pdf>>.
Liao, et al., "Building Personal Maps from GPS Data", retrieved on Aug. 4, 2009 at <<http://luci.ics.uci.edu/predeployment/websiteContent/weAreLuci/biographies/faculty/djp3/LocalCopy/JR-004.pdf, Proceedings of IJCAI MOO 2005, 2005, pp. 249-265.

Liao et al., "Learning and Inferring Transportation Routines", American Association for Artificial Intelligence Press (AAAI) 19th National Conference on Artificial Intelligence, San Jose, California, Jul. 25-29, 2004, pp. 348-353, retrieved on Apr. 16, 2010 at <<http://www.cs.rochester.edu/~kautz/papers/gps-tracking.pdf>>.
Liao et al., "Location-based Activity Recognition", Proceedings of the 19th Annual Conference on Neural Information Processing Systems (NIPS-2005), Whistler, British Columbia, Canada, Dec. 5-10, 2005, 8 pages, retrieved on Apr. 16, 2010 at <<http://books.nips.cc/papers/files/nips18/NIPS2005_0773.pdf>>.
Mamoulis, Cao, Kollios, Hadjieleftheriou, Tao, Cheung, "Mining, Indexing, and Querying Historical Spatiotemporal Data", retrieved on Dec. 29, 2009 at <<http://i.cs.hku.hk/~nikos/sigkdd2004_1.pdf>>, ACM Proceedings of Conference on Knowledge Discovery and Data Mining (KDD), Aug. 22, 2004, pp. 236-245.
Manning et al., "An Introduction to Information Retrieval", DRAFT, Cambridge University Press, Apr. 1, 2009, 581 pages, retrieved on Apr. 16, 2010 at <<http://nlp.stanford.edu/IR-book/pdf/irbookonlinereading.pdf>>.
Markowetz, et al., "Design and Implementation of a Geographic Search Engine", Eighth International Workshop on the Web Database (WebDB 2005), Baltimore, MD, Jun. 16-17, 2005, Baltimore, MD, 6 pages.
Masoud, et al., "Fast Algorithms for Outlier Detection", retrieved on Dec. 12, 2008 at <<http://www.scipub.org/fulltext/jcs/jcs42129-132.pdf>>, Journal of Computer Science, vol. 4, No. 2, 2008, pp. 129-132.
McKeown, et al., "Integrating Multiple Data Representations for Spatial Databases", retrieved on Dec. 12, 2008 at <<http://mapcontext.com/autocarto/proceedings/auto-carto-8/pdf/integrating-multiple-data-representations-for-spatial-databases.pdf>>, Auto Carto 8 Conference Proceedings (ASPRS and ACSM), 1987, pp. 754-763.
Miller, "Analysis of Fastest and Shortest Paths in an Urban City Using Live Vehicle Data from a Vehicle-to-Infrastructure Architecture", retrieved on Dec. 24, 2009 at <<http://www.sigmacoding.com/jeff/publications/fastest-path-ifac09.pdf>>, Federation on Automatic Control Symposium on Control in Transportation Systems (IFAC), Sep. 2009., pp. 1-5.
Miyaki, et al., "Tracking Persons Using Particle Filter Fusing Visual and Wi-Fi Localizations for Widely Distributed Camera", retrieved on Aug. 4, 2009 at <<http://ieeexplore.ieee.org/stamp/stamp.jsp?arnumber=04379287>>, IEEE Intl Conference on Image Processing, ICIP 2007, vol. 3, 2007, pp. 225-228.
Monreale, et al., "WhereNext: a Location Predictor on Trajectory Pattern Mining", retrieved Aug. 4, 2009 at <<http://delivery.acm.org/10.1145/1560000/1557091/p637-monreale.pdf?key1=1557091&key2=5182739421&coll=GUIDE&dl=GUIDE&CFID=47499709&CFTOKEN=90308932>>, ACM, KDD 2009, 2009, pp. 637-645.
Morimoto, "Mining Frequent Neighboring Class Sets in Spatial Databases", retrieved on Dec. 29, 2009 at <<http://delivery.acm.org/10.1145/510000/502564/p353-morimoto.pdf?key1=502564&key2=1634712621&coll=GUIDE&dl=GUIDE&CFID=70432903&CFTOKEN=93744375>>, ACM Proceedings of Conference on Knowledge Discovery and Data Mining (KDD), 2001, pp. 353-358.
Morse, Patel, "An Efficient and Accurate Method for Evaluating Time Series Similarity", retrieved on Apr. 15, 2010 at <<http://www.eecs.umich.edu/db/files/sigmod07timeseries.pdf>>, ACM, Proceedings of Conference on Management of Data, Jun. 11, 2007, pp. 569-580.
Park et al., "Location-Based Recommendation System Using Bayesian User's Preference Model in Mobile Devices", J. Indulska et al. (Eds.): UIC 2007, LNCS 4611, pp. 1130-1139, retrieved on Apr. 30, 2010 at <<http://sclab.yonsel.ac.kr/publications/paper/IC/UIC07-MHPark.pdf>>.
Patterson, et al., "Inferring High-Level Behavior from Low-Level Sensors", retrieved on Aug. 4, 2009 at <<http://www.cs.rochester.edu/u/kautz/papers/High-Level-140.pdf>>, UBICOMP 2003, 2003, pp. 1-18.
Pfoser et al., "Novel Approaches in Query Processing for Moving Object Trajectories", Proceedings of the 26th International Conference on Very Large Data Bases (VLDB 2000), Cairo, Egypt, Sep. 10-14, 2000, pp. 395-406.

(56) References Cited

OTHER PUBLICATIONS

Popivanov, et al., "Similarity Search Over Time-Series Data Using Wavelets", Proceedings of the 18th International Conference on Data Engineering (ICDE'02),IEEE Computer Society, San Jose, CA, Feb. 26-Mar. 1, 2002, 10 pages.

Rekimoto, et al., "LifeTag: WiFi-based Continuous Location Logging for Life Pattern Analysis", retrieved on Aug. 4, 2009 at <<http://209.85.229.132/search?q=cache:fCil8hzKWxQJ:www.sonycsl.co.jp/person/rekimoto/papers/loca07.pdf+mining+individual+life+pattern+based+on+location+history&cd=5&hl=en&ct=clnk&gl=uk>>, LoCA 2007, 2007, pp. 35-49.

Roussopoulos, Kelley, Vincent, "Nearest Neighbor Queries", retrieved on Apr. 15, 2010 at <<http://www.cs.umd.edu/~nick/papers/nncolor.pdf>>, ACM, Presentation: Conference on Management of Data, 1995, pp. 1-23.

Saltenis, "Outlier Detection Based on the Distribution of Distances between Data Points", retrieved on Dec. 12, 2008 at <<http://www.mii.It/informatica/pdf/INFO558.pdf>>, Informatica, vol. 15, No. 3, 2004, pp. 399-400.

Salton, et al., "A Vector Space Model for Automatic Indexing", Communications of the ACM, vol. 187, No. 11, Nov. 1975, pp. 613-620.

Salton, "Dynamic Document Processing", Communications of the ACM, vol. 15, Issue 7, Jul. 1972, pp. 658-668.

Schonfelder, "Between Routines and Variety Seeking: The Characteristics of Locational Choice in Daily Travel", retrieved on Dec. 12, 2008 at <<http://www.ivt.ethz.ch/vpl/publications/reports/ab192.pdf>>, 10th International Conference on Travel Behaviour Research, Aug. 10-15, 2003, pp. 1-32.

Sellen, et al., "Do Life-Logging Technologies Support Memory for the Past? An Experimental Study Using SenseCam", available at least as early as Nov. 16, 2007, at <<http://research.microsoft.com/sds/papers/SensecamMemCHICamRdy.pdf>>, pp. 10.

"Share My Routes", retrieved on Apr. 15, 2010 at <<http://www.sharemyroutes.com/>>, 2010, pp. 1-2.

Sherkat, Rafiei, "On Efficiently Searching Trajectories and Archival Data for Historical Similarities", retrieved on Apr. 15, 2010 at <<http://webdocs.cs.ualberta.ca/~drafiei/papers/vldb08.pdf>>, VLDB Endowment, Proceedings of Conference on Very Large Data Bases (VLDB), vol. 1, No. 1, Aug. 24, 2008, pp. 896-908.

Simon, Frohlich, "A Mobile Application Framework for the geospatial Web", retrieved on Apr. 16, 2010 at <<http://www2007.org/papers/paper287.pdf>>, ACM, Proceedings of World Wide Web Conference (WWW), May 8, 2007, pp. 381-390.

Singh et al., "Relational Learning via Collective Matrix Factorization", Proceedings of the 14th ACM SIGKDD International Conference on Knowledge Discovery and Data Mining, Las Vegas, Nevada, Aug. 24-27, 2008, pp. 650-658, retrieved on Apr. 30, 2010 at <<http://www.cs.cmu.edu/~ggordon/CMU-ML-08-109.pdf>>.

Sohn, et al., "Mobility Detection Using Everyday GSM Traces", retrieved on Aug. 4, 2009 at <<http://www.placelab.org/publications/pubs/mobility-ubicomp2006.pdf>>, UBICOMP 2006, 2006, pp. 212-224.

Srebro et al., "Weighted Low-Rank Approximations", Proceedings of the 20th International Conference on Machine Learning (ICML-2003), Washington, CD, Aug. 21-24, 2003, 8 pages, retrieved on Apr. 30, 2010 at <<http://people.scail.mit.edu/tommi/papers/SreJaa-icml03.pdf>>.

Takeuchi et al., "City Voyager: An Outdoor Recommendation System Based on User Location History", Proceedings of the 3rd International Conference on Ubiquitous Intelligence and Couputing (UIC 2006), Wuhan, China, Sep. 3-6, 2006, pp. 625-636.

Tsoukatos, et al., "Efficient Mining of Spatiotemporal Patterns", Proceedings of the 7th International Symposium on Spatial and Temporal Databases LNCS 2121, Redondo Beach, CA, Jul. 12-15, 2001, pp. 425-442.

Vlachos, Kollios, Gunopulos, "Discovering Similar Multidimensional Trajectories", retrieved on Apr. 15, 2010 at <<http://www.google.co.in/url?sa=t&source=web&ct=res&cd=1&ved=0CAcQFjAA&url=http%3A%2F%2Fciteseerx.ist.psu.edu%2Fviewdoc%2Fdownload%3Fdoi%3D10.1.1.106.1984%26rep%3Drep1%26type%3Dpdf&rct=j&q=Discovering+similar+multidimensional+trajectories&ei=ivfGS6HCM4uj_ga3wOiBDQ&usg=AFQjCNG20j6K3s_WuY-VhWeDjIPYpgxv1Q>>, IEEE Computer Society, Proceedings of Conference on Data Engineering (ICDE), 2002, pp. 673-684.

Wang et al., "An Optimized Location-based Mobile Restaurant Recommend and Navigation System", WSEAS Transactions on Information Science and Applications, vol. 6, Issue 5, May 2009, pp. 809-818, retrieved on Apr. 16, 2010 at <<http://www.wseas.us/e-library/transactions/information/2009/29-186.pdf>>.

Wang, et al., "Closet+: Searching for the Best Strategies for Mining Frequent Closed Itemsets", retrieved on Aug. 4, 2009 at <<http://www.cs.umd.edu/~samir/498/wang03closet.pdf>>, ACM, SIGKDD 2003, 2003, pp. 236-245.

Wang et al., "Unifying User-based adn Item-based Collaborative Filtering Approaches by Similarity Fusion", Proceedings of the 29th Annual International ACM SIGIR Conference on Research and Development in Information Retrieval, Seattle, Washington, Aug. 6-11, 2006, pp. 501-508, retrieved on Apr. 30, 2010 at <<http://ict.ewi.tudelft.nl/pub/jun/sigir06_similarityfuson.pdf>>.

Ward et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, 7 pages, retrieved Apr. 30, 2010 at <<http://www.cs.dartmouth,edu/-tanzeem/pubs/AAA1051WyattD.pdf>>.

Winogard, "Dynamic Cartograms for Navigating Geo-referenced Photographs", available at least as early as Nov. 16, 2007, at <<http://cs.stanford.edu/research/project.php?id=289>>, pp. 2.

Xiao, Xie, Luo, Ma, "Density Based Co-Location Pattern Discovery", retrieved on Dec. 29, 2009 at <<http://www.cse.ust.hk/~xiaoxy/pub/gis-08.pdf>>, ACM Proceedings of Conference on Advances in Geographic Information Systems (SIGSPATIAL), OLAP and co-location mining, Article 29, Nov. 5, 2008, pp. 1-10.

Xie, Zheng, "GeoLife: Building social networks using human location history", retrieved on Apr. 15, 2010 at <<http://research.microsoft.com/en-us/projects/geolife/>>, Microsoft Corporation, 2010, pp. 1-8.

Xue, "Efficient Similarity Search in Sequence Databases", retrieved on Apr. 15, 2010 at <<http://www.cs.uwaterloo.ca/~david/cs848/presentation-similarity-fengxue.pdf>>, University of Waterloo, Ontario Canada, Course Paper: CS 860 Topics in Database Systems, Nov. 18, 2009, pp. 1-7.

Yan, et al., "Clospan: Mining Closed Sequential Patterns in Large Datasets", retrieved on Aug. 4, 2009 at <<http://citeseerx.ist.psu.edu/viewdoc/download;jsessionid=AFADA02A222CC497F30CEC7317F6C7A5?doi=10.1.1.12.3538&rep=rep1&type=pdf>>, Proceedings of SIAM Int. Conference on Data Mining, SDM 2003, 2003, pp. 166-177.

Yan, et al., "Feature-based Similarity Search in Graph Structures", ACM Transactions on Database Systems, vol. V, No. N, Jun. 2006, 36 pages.

Yavas, et al., "A data mining approach for location prediction in mobile environments", retrieved on Aug. 4, 2009 at <<http://www.cs.bilkentedu.td~oulusoy/dke05.pdf>>, Elsevier B.V., 2004, pp. 121-146.

Zhang, Mamoulis, Cheung, Shou, "Fast Mining of Spatial Collocations", retrieved on Dec. 29, 2009 at <<http://i.cs.hku.hk/~dcheung/publication/sigkdd2004_2.pdf>>, ACM Proceedings of Conference on Knowledge Discovery and Data Mining (SIGKDD), Aug. 22, 2004, pp. 384-393.

Zhang, et al., "Mining Non-Redundant High Order Correlations in Binary Data", International Conference on Very Large Data Bases (VLDB), Aukland, NZ, Aug. 23-28, 2008, pp. 1178-1188.

Zhao, et al., "Searching for Interacting Features", Proceedings of the 20th International Joint Conference on Artificial Intelligence, Hyderabad, India, Jan. 6-12, 2007, pp. 1156-1161.

Zheng et al., "Collaborative Filtering Meets Mobile Recommendation: A User-centered Approach", to be presented at the Association for the Advancement of Artificial Intelligence (AAAI) 24th Conference on Artificial Intelligence, Atlanta, Georgia, Jul. 11-15, 2010, 6 pages., retrieved on Apr. 16, 2010 at <<http://research.microsoft.

(56) References Cited

OTHER PUBLICATIONS com/pubs/122244/AAAI10-Collaborative%20Filtering%20Meets%20Mobile%20Recommendation%20A%20User-centered%20Approach.pdf>>.
Zheng, Wang, Zhang, Xie, Ma, "GeoLife: Managing and Understanding Your Past Life over Maps", retrieved on Dec. 29, 2009 at <<http://research.microsoft.com/en-us/people/yuzheng/zheng-geolife-managing_and_understanding_your_past_life_over_map.pdf>>, IEEE Computer Society, Proceedings of Conference on Mobile Data Manage, 2008, pp. 211-212.
Zheng et al., "GeoLife2.0: A Location-Based Social Networking Service", Proceedings of the 10th International Conference on Mobile Data Management Systems, Services and Middleware, Taipei, Taiwan, May 18-20, 2009, pp. 357-358, retrieved on Apr. 16, 2010 at <<http://ieeexplore.ieee.org/stamp/stamp.jsp?tp=&arnumber=5088957>>.
Zheng et al., "Joint Learning User's Activities and Profiles from GPS Data", ACM Geographic Information Systems Workshop on Location Based Social Networks (ACM LBSN 2009), Seattle, Washington, Nov. 3, 2009, pp. 17-20, retrieved on Apr. 16, 2010 at <<http://delivery.acm.org/10.1145/1630000/1629894/p17-zheng.pdf?key1=1629894&key2=6324041721&coll=GUIDE&dl=GUIDE&CFID=86381688&CFTOKEN=49903381>>.
Zheng et al., "Learning Transportation Mode from Raw GPS Data for Geographic Applications on the Web", ACM Conference on World Wide Web (ACM WWW 2008)), Apr. 21, 2008, pp. 247-256, retrieved on Apr. 16, 2010 at <<http://research.microsoft.com/pubs/78567/fp485-Zheng.pdf>>.
Zheng et al., "Microsoft GeoLife Project, GeoLife: Building social networks using human location history", Microsoft Research, 2009, 4 pages, retrieved on Apr. 16, 2010 at <<http://research.microsoft.com/en-us/projects/geolife/default.aspx>>.
Zheng et al., "Mining Interesting Locations and Travel Sequences from GPS Trajectories", Proceedings of the 18th International Conference on World Wide Web (WWW 2009), Madrid, Spain, Apr. 20-24, 2009, pp. 791-800, retrieved on Apr. 16, 2010 at <<http://research.microsoft.com/pubs/79440/fp120-zheng.pdf>>.
Zheng et al., "Recommending Friends and Locations Based on Individual Location History", ACM Trans. Asian Language Information Processing, vol. 6, No. 3, Article 9, Ch. 45, Nov. 2007, 47 pages, retrieved on Apr. 16, 2010 at <<http://research.microsoft.com/pubs/122435/Recommending%20friends%20and%20locations%20based%20on%20individual%20location%20history.pdf>>.
Zheng, Li, Chen, Xie, Ma, "Understanding Mobility Based on GPS Data", retrieved on Dec. 29, 2009 at <<http://delivery.acm.org/10.1145/1410000/1409677/p312-zheng.pdf?key1=1409677&key2=03647126621&coll=GUIDE&dl=GUIDE&CFID=70433597&CFTOKEN=93582958>>, ACM Proceedings of Conference on Ubiquitous Computing (UbiComp), vol. 344, Sep. 21, 2008, pp. 312-321.
Ahern, et al., "World Explorer: Visualizing Aggregate Data From Unstructured Text in Geo-Referenced Collections", In the Proceedings of the 7th ACM/IEEE-CS Joint Conference on Digital Libraries, 2007, pp. 1-10.
Graham, "GPS Gadgets Can Reveal More Than Your Location", Retrieved on Nov. 28, 2011 at <<http://www.google.com/#sclient=psy-ab&hl=en&source=hp&q=Graham%2C+GPS+Gadgets+Can+Reveal+More+Than+Your+Location&pbx=1&oq=Graham%2C+GPS+Gadgets+Can+Reveal+More+Than+Your+Location%22%2C+&aq=f&aqi=&aql=&gs_sm=d&gs_upl=287016708l0l10l140l2l2l0l0l0l0l266l43 8l0.1.1l210&bav=on.2,or.r_gc.r_pw.,cf.osb&fp=533a712cc6ce8ba0&biw=1280&bih=808>>, 2008, pp. 1-2.
Hariharan, et al., "Project Lachesis: Parsing and Modeling Location Histories", ACM, In the Proceedings of GIScience, 2004, pp. 106-124.
Office Action for U.S. Appl. No. 12/562,588, mailed on Dec. 8, 2011, Yu Zheng, "Mining Life Pattern Based on Location History", 31 pgs.

Schofield, "It's GeoLife, Jim, But Not as we Know it", Guardian News, Retrieved on Nov. 28, 2011 at <<http://www.guardian.co.uk/technology/2008/mar/13/microsoft.research/print>>, Mar. 12, 2008, 2 pgs.
Ye, et al., "Mining Individual Life Pattern Based on Location History," Tenth International Conference on Mobile Data Management: Systems, Services and Middleware, May 18-20, 2009, Taipei, 10 pages.
Zheng, et al., "Searching Your Life on Web Maps", Microsoft Research, Available at <<http://research.microsoft.com/en-us/people/yuzheng/searching_your_life_over_web_maps.pdf>>, 2008, 4 pgs.
Liao, et al. "Learning and inferring transportation routines", Artificial Intelligence, vol. 171, 2007, pp. 311-331.
Office action for U.S. Appl. No. 12/037,347, mailed on Jan. 13, 2014, Zheng, et al., "System for Logging Life Experiences Using Geographic Cues", 8 pages.
Office action for U.S. Appl. No. 12/041,608, mailed on Nov. 22, 2013, Josefsberg, et al., "Client-Side Management of Domain Name Information", 7 pages.
Office action for U.S. Appl. No. 12/794,538, mailed on Nov. 25, 2013, Zheng, et al., "Searching Similar Trajectories by Locations", 18 pages.
Office action for U.S. Appl. No. 13/324,758, mailed on Jul. 11, 2013, Zheng et al., "Urban Computing of Route-Oriented Vehicles", 47 pages.
bing.com, Maps, Retrieved on Dec. 28, 2009 at <<http://cn.bing.com/ditu/>>, 2 pgs.
Brakatsoulas, et al., "On Map-Matching Vehicle Tracking Data", VLDB Endowment, In the Proceedings of the 31st International Conference on Very Large Data Bases, 2005, pp. 853-864.
Chawathe, "Segment-Based Map Matching", In the Proceedings of the IEEE Intelligent Vehicles Symposium, Jun. 13-15, 2007, pp. 1190-1197.
Goldberg, et al., "Computing the Shortest Path: A Search Meets Graph Theory", SIAM, In the Proceedings of the Sixteenth Annual ACM-SIAM Symposium on Discrete Algorithms, 2005, pp. 156-165, 10 pgs.
Gonzalez, et al., "Adaptive Fastest Path Computation on a Road Network: A Traffic Mining Approach", ACM, In the Proceedings of the 33rd International Conference on Very Large Data Bases, Sep. 23-27, 2007, pp. 794-805.
Greenfeld, "Matching GPS Observations to Locations on a Digital Map", In the Proceedings of the 81st Annual Meeting of the Transportation Research Board, Washington DC, Jan. 2002, 13 pgs.
Gutman, "Reach-Based Routing: A New Approach to Shortest Path Algorithms Optimized for Road Networks", In the Proceedings of the Sixth Workshop on Algorithm Engineering and Experiments and the First Workshop on Analytic Algorithmics and Combinatorics, New Orleans, LA, USA, Jan. 10, 2004, 12 pgs.
Hart, et al., "A Formal Basis for the Heuristic Determination of Minimum Cost Paths", In the Proceedings of IEEE Transactions of Systems Science and Cybernetics, vol. 4, No. 2, Feb. 12, 2007 (First Publication 1968), pp. 100-107.
Jing, et al., "Hierarchical Optimization of Optimal Path Finding for Transportation Applications", (University of Michigan Research Paper, 1996, pp. 269-276) In the Proceedings of the Fifth International Conference on Informaton and Knowledge Management, 1996, pp. 261-268.
Li, et al., "A Connectivity-Based Map Matching Algorithm", AARS, Asian Journal of Geoinformatics, 2005, vol. 5, No. 3, pp. 69-76.
Li, et al., "Traffic Density-Based Discovery of Hot Routes in Road Networks", Springer-Verlag, Advances in Spatial and Temporal Databases, 2007, pp. 441-459.
Liao, et al., "Learning and Inferring Transportation Routines", Elsevier, Artificial Intelligence, vol. 171, Issues 5-6, Apr. 2007, pp. 311-331.
Nicholson, "Finding the Shortest Route Between Two Points in a Network", British Computer Society, The Computer Journal, 1966, vol. 9, No. 3, pp. 275-280.
Patterson, et al., "Inferring High-Level Behavior from Low-Level Sensors", Springer-Verlag Berlin Heidelberg, Lecture Notes in Computer Science, International Conference on Ubiquitous Computing, 2003, vol. 2864, pp. 73-89.

(56) References Cited

OTHER PUBLICATIONS

Pfoser, et al., "Capturing the Uncertainty of Moving-Object Representations", Springer-Verlag, In the Proceedings of the 6th International Symposium on Advances in Spatial Databases, Lecture Notes in Computer Science, 1999, vol. 1651, pp. 111-131.
Quddus, et al."Current Map-Matching Algorithms for Transport Applications: State-of-the-Art and Future Research Directions", Elsevier Ltd., Transportation Research Part C: Emerging Technologies, 2007, vol. 15, Issue 5, pp. 312-328.
Taylor, et al., "Virtual Differential GPS & Road Reduction Filtering by Map Matching", In the Proceedings of ION'99, Twelfth International Technical Meeting of the Satellite Division of the Institute of Navigation, 1999, pp. 1675-1684.
Zheng, et al., "GeoLife: Managing and Understanding Your Past Life over Maps", IEEE Computer Society, In the Proceedings of the Ninth International Conference on Mobile Data Management, 2008, pp. 211-212, 2 pgs.
Office action for U.S. Appl. No. 12/567,667, mailed on Feb. 25, 2014, Zheng et al., "Recommending Points of Interests in a Region", 31 pages.
Office action for U.S. Appl. No. 12/353,940, mailed on Mar. 4, 2014, Zheng, et al., "Detecting Spatial Outliers in a Location Entity Dataset", 10 pages.
Office action for U.S. Appl. No. 13/324,758, mailed on Jun. 17, 2015, Zheng et al., "Urban Computing of Route-Oriented Vehicles", 38 pages.
Office action for U.S. Appl. No. 14/659,125, mailed on Jun. 19, 2015, Inventor #1, "Recommending Points of Interests in a Region", 7 pages.
Ashbrook,et al., "Using GPS to Learn Significant Locations and Predict Movement Across Multiple Users", Journal of Personal and Ubiquitous Computer Archive, vol. 7, Issue 5, Oct. 2003, 15 pages.
Breiman, "Bagging Pedictors", Machine Learning, vol. 24, No. 2, Aug. 1996, pp. 123-140.
Chen, et al., "GeoTracker Geospatial and Temporal RSS Navigation", WWW2007, May 2007, pp. 41-50.
"CRF++: Yet Another CRF Toolkit", retrieved on Jan. 18, 2008 from <<http://crfpp.sourceforge.net>>, 13 pages.
Hadjieleftheriou, et al., "Complex Spatio-Temporal Pattern Queries", Proceedings of the 31st VLDB Conference, Sep. 2005, pp. 877-888.
Hadjieleftheriou, et al., "Efficient Indexing of Spatiotemporal Objects", Proceedings of the 8th International Conference on Extending Database Technology: Advances in Database Technology, Mar. 2002, 10 pages.
Han, et al., "Predicting User' Movement with a Combination of Self-Organizing Map and Markov Model", ICANN 2006, Part II, LNCS 4132, Sep. 2006, pp. 884-893.
International Preliminary Report on Patentability cited in PCT Application No. PCT/US2009/032777 dated Sep. 10, 2010, 6 pages.
Ishi, et al., "Head Motion During Dialogue Speech and Nod Timiong Control in Humanoid Robots", 5th ACM/IEEE International Conference on Human-Robot Interaction (HRI'10), Mar. 2010, pp. 293-300.
International Search Report and Written Opinion Received for PCT Application No. PCT/US2009/0327777, mailed Aug. 26, 2009, 10 pages.
International Search Report dated Aug. 19, 2009 for PCT Application No. PCT/US2009,032778, filed Jan. 31, 2009, 11 pages.
Lafferty, et al., "Conditional Random Fields: Probabilistic Models for Segmenting and Labeling Sequence Data", Proceedings of the 18th International Conference on Machine Learning, Jun. 2001, 8 pages.
Mitchell, et al., "Six in the City: Introducing Real Tournament—A Mobile IPv6 Based Context-Aware Multiplayer Game", NetGames'03, May 2003, pp. 91-100.
"North York Moors and Yorkshire Wolds Mountain Bke (MTB) Routes", retrieved on Jan. 17, 2008 from <<http://www.mtb-routs.co.uk/northyorkmorrs/default.aspx>>, 4 pages.

Office action for U.S. Appl. No. 12/794,538, mailed on Apr. 22, 2014, Zheng et al., "Searching Similar Trajectories by Locations", 38 pages.
Non-Final Office Action for U.S. Appl. No. 12/041,608, mailed on Jun. 25, 2014, Josefsberg, et al., "Client-Side Management of Domain Name Information", 4 pages.
Office action for U.S. Appl. No. 12/712,053, mailed on Jun. 6, 2014, Zheng et al., "Route Computation Based on Route-Oriented Vehicle Trajectories", 24 pages.
Office Action for U.S. Appl. No. 12/353,940, mailed on Jul. 17, 2014, Yu Zheng, "Detecting Spatial Outliers in a Location Entity Dataset", 10 pages.
Final Office Action for U.S. Appl. No. 12/567,667, mailed on Aug. 27, 2014, Yu Zheng, "Recommending Points of Interests in a Region", 7 pages.
"SlamXR List Routes Page by Microsoft Research Community Technologies Group", retrieved on Jan. 18, 2008 from <<http://www.msslam.com/slamxr/ListRoutes.aspx>, 2 pages.
"SportsDo", retrieved on Jan. 17, 2008 from <<http://sportsdo.net/Activity/ActivityBlog.aspx>>, 3 pages.
Strachan, et al., "gpsTunes Controlling Navigation via Audio Feedback", Proceedings of MobileHCI, Sep. 2005, 4 pages.
Sui, "Decision Support Systems Based on Knowledge Management", Proceedings of the International Conference on Services Systems and Services Management (ICSSSM'05), Jun. 2005, vol. 2, pp. 1153-1156.
Tezuka, et al., "Toward Tighter Integration of Web Search with a Geographic Information System", WWW2006, May 2006, 10 pages.
Theodoridis, et al., "Spatio-Temporal Indexing for Large Multimedia Applications", Proceedings of the IEEE International Conference on Multimedia Systems, Jun. 1996, 9 pages.
Theodoridis, et al., "Specifications for Efficient Indexing in Spatiotemporal Databases", Proceedings of the SDDBM'98, Jul. 1998, 10 pages.
Toyama, et al., "Geographic Location Tags on Digital Images", MM'03, Nov. 2003, 11 pages.
"Twittervision", retrieved on Jan. 18, 2008 from <<http://twittervision.com>>, 1 page.
Wasinger, et al., "M3I in a Pedestian Navigation & Exploration System", Proceedings of the Fifth International Symposium on Human Computer Interaction with Mobile Devices, Sep. 2003, 5 pages.
Wei, et al., "A Service-Portlet Based Visual Paradigm for Personalized Convergence of Information Resources", 2nd IEEE International Conference on Computer Science and Information Technology, Aug. 2009, pp. 119-124.
"Weka 3: Data Mining Software in Java", retrieved on Jan. 18, 2008 from <<http://www.cs.waikato.ac.nz/ml/weka/index_home.html, 1 page.
"Welcome to WalkJogRun", retrieved on Jan. 17, 2008 from <<http://www.walkjogrun.net>>, 1 page.
"WikiWalki Community Trail Guide", retrieved on Jan. 17, 2008 from <<http://www.wikiwalki.com>>, 1 page.
Zhang, et al., "Research on Information Fusion on Evaluation of Driver Fatigue", 2008 International Symposium on Computer Scientc and Computational Technology, Dec. 2008, pp. 151-155.
Office action for U.S. Appl. No. 12/794,538, mailed on Aug. 14, 2015, Zheng et al., "Searching Similar Trajectories by Locations", 10 pages.
Office Action for U.S. Appl. No. 13/324,758, mailed on Dec. 24, 2014, Zheng et al., "Urban Computing of Route-Oriented Vehicles", 54 pages.
Office action for U.S. Appl. No. 12/712,053, mailed on Mar. 10, 2015, Zheng et al., "Route Computation Based on Route-Oriented Vehicle Trajectories", 22 pages.
Office action for U.S. Appl. No. 12/794,538, mailed on Mar. 23, 2015, Zheng et al., "Searching Similar Trajectories by Locations", 8 pages.
Office action for U.S. Appl. No. 12/794,538, mailed on Sep. 13, 2013, Zheng, et al., "Searching Similar Trajectories by Locations", 12 pages.
Takeuchi et al., "An Outdoor Recommendation System Based on User Location History", Proceedings of the 1st International Work-

(56) References Cited

OTHER PUBLICATIONS shop on Personalized Context Modeling and Management for UbiComp Applications (ubiPCMM 2005), Tokyo, Japan Sep. 11, 2005, pp. 91-100, retrieved on Apr. 16, 2010 at <<http://docs.google.com/viewer?a=v&q=cache:YIN-In6ZcXMJ:citeseerx.ist.psu.edu/viewdoc/download%3Fdoi%3D10.1.1.91.813%26rep%3Drep1%26type%3Dpdf+An+outdoor+recommendation+system+based+on+user+location+history&hl=en&gl=in&pid=bl&srcid=ADGEESgYbZnkev0rbu0l8Nm3j8a4HXHilCtHgEvxWdua4tDaQFPVEwnMtX6y9N07N5vOHOpzSoBNxis8ln6fadaZvXyb_XtuTwWhzNcCayvDXpgoGP7QaJCStspRLn830NkWVy7_R-i9&sig=AHIEtbQTIEOI3XHfa1KJtRr29GNt3stWpA>>.

Yi, Jagadish, Faloutsos, "Efficient Retrieval of Similar Time Sequences under Time Warping", retrieved on Apr. 15, 2010 at <<http://www.google.co.in/url?sa=t&source=web&ct=res&cd=3&ved=0CBYQFjAC&url=http%3A%2F%2Fciteseerx.ist.psu.edu%2Fviewdoc%2Fdownload%3Fdoi%3D10.1.1.105.6211%26rep%3Drep1%26type%3Dpdf&rct=j&q=Efficient+retrieval+of+similar+time+sequences+under+time+warping&ei=4ffGS5ShA4_0_Aalk5z8DA&usg=AFQjCNEkCq5vQwgb6OQfZmT_RWcgMZ2YNA>>, IEEE Computer Society, Presentation: Proceedings of Conference on Data Engineering (ICDE), 1998, pp. 1-15.

Carter, et al., "When Participants Do the Capturing: The Role of Media in Diary Studies," CHI 2005: 899-908, 10 pages.

Chakka, et al., "Indexing Large Trajectory Data Sets With SETI*," Proceedings of the 2003 CIDR Conference, pp. 1-12.

Dumas, et al., "Stuff I've Seen: A System for Personal Information Retrieval and Re-Use," SIGIR, Aug. 1, 2003, pp. 1-8.

Freeman, Eric, "Lifestreams: A Storage Model for Personal Data," SIGMOD Record, vol. 25, No. 1, Mar. 1996, pp. 80-86.

Gemmell, et al., "MyLifeBits: A Personal Database for Everything," Microsoft Bay Area Research Center, MSR-TR-2006-23, Feb. 20, 2006, pp. 1-18.

Hadjieleftheriou, et al., "Indexing Spatio-temporal Archives," Proceedings of Extending Database Technology 2002, pp. 1-22.

Klemmer, et al., "Where Do Web Sites Come From? Capturing and Interacting with Design History," CHI, Contextual Displays Paper, Apr. 20-25, 2002, vol. 4, No. 1, pp. 1-8.

Kollios, et al., "Indexing Animated Objects Using Spatiotemporal Access Methods," A TimeCenter Technical Report, TR-54, Jan. 25, 2001, pp. 1-32.

Kumar, et al., "Approximate Minimum Enclosing Balls in High Dimensions Using Core-Sets," Journal of Experimental Algorithmics (JEA), vol. 8, 2003, Artl. No. 1.1, pp. 1-29.

Kumar, et al., "Designing Access Methods for Bitemporal Databases," IEEE Trans. Knowl. Data Eng., 1998, pp. 1-41.

Lou, et al., "Map-Matching for Low-Sampling-Rate GPS Trajectories," ACM GIS '09, ISBN 978-1-60558-649, Nov. 4-6, 2009, pp. 1-10.

Nascimento, et al., "Evaluation of Access Structures for Discretely Moving Points", Proceedings of the International Workshop on Spatio-Temporal Database Management, Sep. 1, 1998, State Univ. of Campinas, Brazil, 18 pp.

Papadopoulos et al., "Performance of Nearest Neighbor Queries in R-Trees", In ICDT, 1997, pp. 394-408.

Salzberg et al., "Comparison of Access Methods for Time-Evolving Data", ACM Computing Surveys, 31(2), 1999, pp. 158-221, 64 pages.

Song et al., "Hashing Moving Objects," Proceedings of 2nd International Conference of Mobile Data Management, 2001, pp. 1-31.

Tao et al., "MV3R-Tree: A Spatio-Temporal Access Method for Timestamp and Interval Queries," Proceedings of the International Conference on Very Large Data Bases, 2001, 10 pages.

Theodoridis et al., "On the Generation of Spatiotemporal Datasets," Advances in Spatial Databases, 6th International Symposium, Lecture Notes in Computer Science, Springer, 1999, 19 pages.

Wang et al., "A Flexible Spatio-Temporal Indexing Scheme for Large-Scale GPS Track Retrieval," MDM '08 9th International Conference on Mobile Data Management, IEEE, Beijing, 8 pages.

Wyatt et al., "Unsupervised Activity Recognition Using Automatically Mined Common Sense", American Association for Artificial Intelligence (AAAI 2005), Proceedings of the 20th National Conference on Artificial Intelligence, Pittsburgh, Pennsylvania, Jul. 9-13, 2005, pp. 21-27, 7 pages.

Yuan et al., "An Interactive-Voting Based Map Matching Algorithm," In IEEE Conference on Mobile Data Management (MDM), 2010, 10 pages.

International Preliminary Report on Patentability for PCT Application No. PCT/US2009/032774, dated Aug. 31, 2010.

International Preliminary Report on Patentability for PCT Application No. PCT/US2009/032777, dated Aug. 31, 2010.

International Search Report and the Written Opinion for PCT Application No. PCT/US2009/032778, dated Aug. 19, 2009, 11 pgs.

International Search Report and the Written Opinion for PCT Application No. PCT/US2009/032774, dated Sep. 15, 2009, 16 pgs.

Office Action for U.S. Appl. No. 13/195,496, dated Oct. 21, 2011, Yu Zheng, "Learning Transportation Modes from Raw GPS Data", 7 pages.

Office Action for U.S. Appl. No. 12/037,263, dated Oct. 8, 2010, Longhao Wang, "Indexing Large-Scale GPS Tracks", 7 pages.

Office Action for U.S. Appl. No. 12/794,538, dated Nov. 29, 2011, Zheng et al. "Searching Similar Trajectories by Locations", 10 pages.

Office Action for U.S. Appl. No. 13/195,496, dated Feb. 7, 2012, Yu Zheng, "Learning Transportation Modes from Raw GPS Data", 7 pages.

Office Action for U.S. Appl. No. 12/037,263, dated Mar. 29, 2011, Longhao Wang, "Indexing Large-Scale GPS Tracks", 8 pages.

Office Action for EP Patent Application No. 09 715 263.1, dated Feb. 16, 2015, "Learning Transportation Modes from Raw GPS Data", 5 pages.

Office Action dated Oct. 9, 2015 for European Patent Application No. 09 715 263.1.

Supplemental EP Search Report App. No. 09713700.4 dated Jul. 17, 2012, 9 pages.

Blandford, Rafe, "Looking at Lifeblog," retrieved at <<http://www.allaboutsymbian.com/features/item/Looking_at_Lifeblog.php>>, Oct. 18, 2004, 14 pages.

Flickr. http://www.flickr.com/, 1 pages.

Geek Magazine, "LifeLog: DARPA looking to record lives of interested parties," retrieved at <<http://www.geek.com/news/lifelog-darpa-looking-to-record-lives-of-interested-parties-552879/>>, retrieved on Sep. 23, 2013, published on Jun. 3, 2003, 4 pages.

GeoLife GPS Trajectories, <<http://research.microsoft.com/en-us/downloads/b16d359d-d164-469e-9fd4- daa38f2b2e13/default.aspx.

Hanlon, Mike, "Nokia Lifeblog is an automated multimedia diary," retrieved at <<http://www.gizmag.com/go/2729/>>, Jun. 4, 2004, 5 pages.

International Preliminary Report on Patentability for PCT Application No. PCT/US2009/032778, dated Aug. 31, 2011.

Kim et al., "A Spatiotemporal Data and Indexing," Proceedings of IEEE Region 10 International Conference eon Electrical and Electronic Technology, Singapore, Aug. 19-22, 2001, pp. 110-113.

Kolovson et al., "Segment Indexes: Dynamic Indexing Techniques for Multi-Dimensional Interval Data," Proceedings of the ACM SIGMOD Conference on Management of Data, 1991, pp. 138-147, 10 pages.

Kuechne et al., "New Approaches for Traffic Management in Metropolitan Areas," in 10th IFAC Symposium on Control in Transportation Systems, Aug. 2003, 9 pages.

Mead, Nick, "Lifeblog 2.5," retrieved at <<http://lifeblog.en.softonic.com/symbian>>, Feb. 25, 2008, 2 pages.

Mountain Bike. http://www.mtb-tracks.co.uk/northyorkmoors/default.aspx, retrieved Jan. 18, 2008, 2 pages.

Nascimento et al., "Towards historical R-trees," Proc. of the ACM Symp. on Applied Computing, SAC, pp. 235-240, Feb. 1998, 6 pages.

Office Action for U.S. Appl. 12/794,538, dated Nov. 29, 2012, Zheng et al. "Searching Similar Trajectories by Locations", 10 pages.

(56) References Cited

OTHER PUBLICATIONS

Office Action for U.S. Appl. No. 12/037,347, dated Mar. 1, 2011, Zheng, et al., System For Logging Life Experiences Using Geographic Cues, 18 pages.

Rao et al., "Making B+-tree Cache Sensitive in Main Memory," Proceedings of ACM SIGMOD Conference, 2000, pp. 475-486, 12 pages.

Shachtman, Noah, "A Spy Machine of DARPA's Dreams," retrieved at <<http://archive.wired.com/techbiz/media/news/2003/05/58909?currentPage=all>>, Wired, May 20, 2003, 1 page.

Shachtman, Noah, "Pentagon Kills Lifelog Project," retrieved at <<http://www.wired.com/2004/02/pentagon-kills-lifelog-project/>>, Wired, Feb. 4, 2004, 6 pages.

Song et al., "SEB-tree: An Approach to Index Continuously Moving Objects," Proceedings of International Conference of Mobile Data Management, pp. 340-344, Jan. 2003.

Weeks, Darren, "LifeLog: Because Big Brother Cares What You're Thinking," retrieved at <<http://www.sweetliberty.org/issues/privacy/lifelog.htm>> on Dec. 3, 2005, Big Brother, 5 pages.

Wikipedia, "DARPA LifeLog," retrieved at <<https://en.wikipedia.org/wiki/DARPA_LifeLog>>, Dec. 14, 2013, 1 page.

Wikipedia, "Nokia Lifeblog", retrieved at <<https://en.wikipedia.org/wiki/Nokia_Lifeblog>>, on Feb. 26, 2008, 2 pages.

Xu et al., "RT-Tree: An Improved R-Tree Indexing Structure for Temporal Spatial Databases," Proc. of the Intl. Symp. Spatial Data Handling, SDH, pp. 1040-1049, Jul. 1990, 5 pages.

Zheng, et al., "Collaborative Location and Activity Recommendations with GPS History Data," Proceedings of the 19th International Conference on World Wide Web, 2010, pp. 1029-1038.

Zheng et al., "Cross-domain Activity Recognition," in Proc. of the 11th International Conference on Ubiquitous Computing (Orlando, USA, 2009), ACM Press, pp. 61-70.

Zheng et al., "Understanding Transportation Modes Based on GPS Data for Web Applications," ACM Transactions on the Web, 4(1):1-36, 2010.

Zhou et al., "Close Pair Queries in Moving Object Databases," Proceedings of ACM GIS, pp. 2-11, 2005, 10 pages.

Agarwal, et al., "Geometric Approximation via Coresets," Combinatorial and Computational Geometry, MSRI Publications, vol. 52, 2005, 30 pages.

Agrawal, et al., "Efficient Similarity Search in Sequence Databases," IBM Almaden Research Center, San Jose, California, 4th International Conference, Oct. 1993, 15 pages.

Fu, et al., "Heuristic shortest path algorithms for transportation applications: State of the art," Science Direct, Computers & Operations Research 33 (2006) 3324-3343, available May 3, 2005; pp. 3324-3343.

Office action for U.S. Appl. No. 13/324,758, dated Feb. 26, 2016, Zheng et al., "Urban Computing of Route-Oriented Vehicles", 32 pages.

Office action for U.S. Appl. No. 12/794,538, dated Mar. 2, 2016, Zheng et al., "Searching Similar Trajectories by Locations", 10 pages.

Office action for U.S. Appl. No. 14/587,270, dated Apr. 8, 2016, Zheng et al., "Determine Spatiotemporal Causal Interactions in Data", 7 pages.

Liao, et al., "Learning and Inferring Transportation Routines", Preprint Elsevier Science, 2007, 32 pages.

Office Action for U.S. Appl. No. 13/324,758, dated Jul. 13, 2016, Zheng et al., "Urban Computing of Route-Oriented Vehicles", 7 pages.

Office action for U.S. Appl. No. 12/794,538, dated Aug. 2, 2016, Zheng et al. "Searching Similar Trajectories by Locations", 7 pages.

International Preliminary Report on Patentability for PCT Application No. PCT/US2009/032778, dated Aug. 31, 2010.

Office action for U.S. Appl. No. 13/324,758, dated Nov. 28, 2016, Zheng et al., "Urban Computing of Route-Oriented Vehicles", 7 pages.

Office Action for U.S. Appl. No. 15/134,523, dated Nov. 4, 2016, Zheng et al., "Recommending Points of Interests in a Region", 12 pages.

The European Office Action dated Feb. 21, 2017 for European Patent Application No. 09714738.3, a counterpart foreign application of U.S. Pat. No. 8,972,177, 7 pages.

Kuhne et al., "New Approaches for Traffic Management in Metropolitan Areas," In 10th IFAC Symposium on Control in Transportation Systems, Aug. 2003, 9 pages.

Office Action for U.S. Appl. No. 15/134,523, dated Feb. 15, 2017, Zheng et al., "Recommending Points of Interests in a Region", 12 pages.

Office Action for U.S. Appl. No. 15/134,523, dated Apr. 6, 2017, Zheng et al., "Recommending Points of Interests in a Region", 15 pages.

\* cited by examiner

| $N$: | $c_1^1$ | $c_1^2$ | $c_1^3$ | $c_2^1$ | $c_2^2$ | $c_3^1$ | $c_3^2$ |
|---|---|---|---|---|---|---|---|
| | 0.8 | 0.2 | 0.5 | 0.6 | 0.6 | 0.4 | 0.3 |

Table 1
1102

$(V, F_t)$:

| | $\rightarrow c_2^1$ | $\rightarrow c_2^2$ |
|---|---|---|
| $c_1^1$ | (0.5, 0.5) | (0.8, 0.5) |
| $c_1^2$ | (0.3, 0.4) | (0.1, 0.9) |
| $c_1^3$ | (0.4, 0.6) | (0.9, 0.9) |

| | $\rightarrow c_3^1$ | $\rightarrow c_3^2$ |
|---|---|---|
| $c_2^1$ | (0.2, 0.6) | (0.1, 0.7) |
| $c_2^2$ | (0.3, 0.3) | (0.5, 0.9) |

Table 2
1104

1106

$P_1$'s candidates    $P_2$'s candidates    $P_3$'s candidates

| $f[\,]$: | $c_1^1$ | $c_1^2$ | $c_1^3$ | $c_2^1$ | $c_2^2$ | $c_3^1$ | $c_3^2$ |
|---|---|---|---|---|---|---|---|
| | 0.8 | 0.2 | 0.5 | 0.95 | 1.04 | 1.076 | 1.175 |

Table 3
1108

MAP-MATCHING FOR LOW-SAMPLING-RATE GPS TRAJECTORIES

BACKGROUND

There has been an increased use of handheld or dashboard-mounted travel guidance systems, for example, Global Positioning System (GPS)-embedded personal digital assistants (PDAs) and smart phones. In addition, there has been an increase in applications such as route planners, hot route finders, traffic flow analyzers, and geographical social network applications that use GPS data to achieve a better quality of service.

Typically, a GPS trajectory consists of a sequence of positions with latitude, longitude, instant speed, direction and timestamp information. However, this data can often be incorrect as a result of measurement errors caused by the limitations of typical GPS devices, as well as sampling errors caused by the sampling rate. Therefore, an observed GPS position often needs to be aligned with a road network on a digital map. This process is referred to as map-matching. The difficulty of map-matching can greatly differ depending on GPS accuracy and the sampling frequency, for example, map-matching is easier with data that is gathered frequently, and with a high degree of accuracy, than with data that is inaccurate or that is gathered less frequently.

Existing map-matching approaches generally employ an algorithm that maps sampled positions from a GPS trajectory onto vector road segments on a map. Such an approach typically considers sampled positions on a GPS trajectory while overlooking the speed and temporal data that may also be found in the GPS trajectory. These map-matching algorithms are typically most accurate when using data gathered at a high sampling rate. As sampling frequency decreases, measurement errors typically increase. However, while a high sampling rate results in increased accuracy, it also carries a greater computational cost.

Map-matching for low-sampling-rate GPS data is challenging because, as the sampling rate decreases, the interval between two neighboring positions in a trajectory increases, and less information is available to deduce the precise location of an object. A more effective approach for map-matching for low-sampling rate GPS trajectories utilizes temporal and speed data from the GPS trajectory to augment the spatial data.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In view of the above, this disclosure describes an exemplary method, user-interface, and computer-readable media for implementing map-matching for low-sampling rate GPS trajectories.

In an exemplary implementation, a mapping module receives a GPS trajectory that represents a path traveled by a user. For example, as the user is driving through town, a GPS device automatically records data at regular, predetermined time intervals. The GPS trajectory includes spatial data (e.g., one or more sampling points, latitude, longitude, and direction) and temporal data (e.g., speed and timestamp). A set of one or more candidate projection points surrounding each of the one or more sampling points of the trajectory is retrieved from a road network database, and one or more candidate road segments upon which the candidate projection points lie are determined. Spatial and temporal analyses are performed on the retrieved set of one or more candidate projection points. A candidate graph is constructed based upon the results of the spatial analysis and the temporal analysis, and the candidate graph is evaluated to determine the set of candidate projection points that best matches the one or more sampling points received from the user.

Map-matching that is performed based on the GPS trajectory may also be used to calculate a recommended route based on user-submitted data that identifies additional locations to which the user would like to travel. For example, a user interface may be provided through which a user submits one or more locations to which the user would like to travel. Those points are appended to the existing GPS trajectory, and the mapping module calculates a route to the user-submitted locations based, at least in part, on the previously collected GPS trajectory. The calculated route is then presented to the user.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

Map-matching for low-sampling rate global positioning system (GPS) trajectories is described. More specifically, an exemplary map-matching algorithm utilizes both a spatial analysis and a temporal analysis to analyze a submitted set of sampling points to determine a best match trajectory, or route, which is presented to the user.

Figure 1:
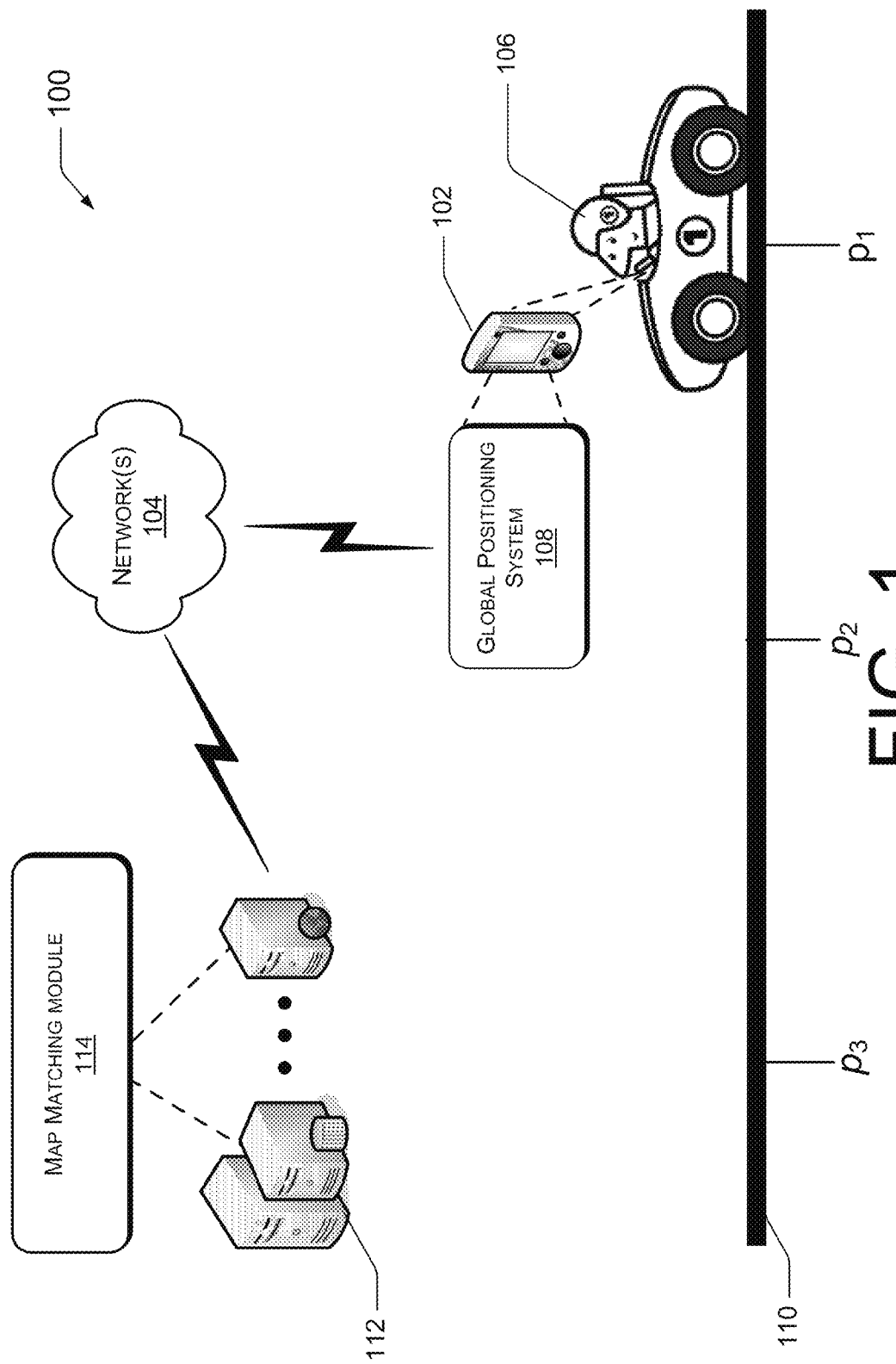
FIG. 1 is a schematic of an illustrative architecture of a map-matching framework.

FIG. 1 is a block diagram of an exemplary environment 100, which is used for map-matching for a low-sampling rate GPS on a computing device. The environment 100 includes an exemplary computing device 102, which may take a variety of forms including, but not limited to, a portable handheld computing device (e.g., a personal digital assistant, a smart phone, a cellular phone), a laptop computer, a desktop computer, a media player, a digital camcorder, an audio recorder, a camera, or any other device capable of connecting to one or more network(s) 104 to log or to record daily activities for a user 106 (i.e., creating a location history). The computing device 102, which connects to one or more network(s) 104, is often associated with a user 106. For example, the user 106 often carries their computing device 102 when travelling outside the home.

The network(s) 104 represent any type of communications network(s), including, but not limited to, wire-based networks (e.g., cable), wireless networks (e.g., cellular, satellite), cellular telecommunications network(s), and IP-based telecommunications network(s) (e.g., Voice over Internet Protocol networks). The network(s) 104 may also include traditional landline or a public switched telephone network (PSTN), or combinations of the foregoing (e.g., Unlicensed Mobile Access or UMA networks, circuit-switched telephone networks or IP-based packet-switch networks).

The computing device 102 accesses a global positioning system (GPS) that conveniently logs navigation and positioning information as the device moves with the user 106. In an exemplary implementation, a GPS 108 in the computing device 102 starts recording location data upon detecting a satellite signal. For example, a GPS receiver collects the location data, $p_1$, $p_2$, and $p_3$ along a GPS trajectory 110 based on pre-determined rate. In the exemplary implementation, the GPS 108 in the computing device 102 uses a low sampling rate to minimize computations and network bandwidth usage. For example, the GPS 108 may record data every 2 minutes, every 5 minutes, or the like. The GPS 108 continues to collect the location data as long as there is a satellite signal detected on the network 104.

The user 106 enters a starting location and a desired destination through a user interface of the computing device 102. The user-submitted starting location and desired destination, along with the data collected by the GPS 108, is sent over network 104 to servers 112. Exemplary servers 112 include a map-matching module 114 that analyzes the data collected by the GPS to determine a preferred route, for example, the shortest and most direct route from the starting location to the user-submitted desired destination. The map-matching module 114 determines the preferred route by preparing candidate projection points, performing spatial and temporal analysis, and matching the results. The determined route is then stored and/or presented visually to the user. Alternatively, the data collected by the GPS may be used to determine a route consisting entirely of highways, a route consisting entirely of service roads, or the like. The map-matching module 114 provides the result back to the user via the computing device 102 through a network service provider, a context-aware computing service, email, text message, a pop up, and the like.

Figure 2:
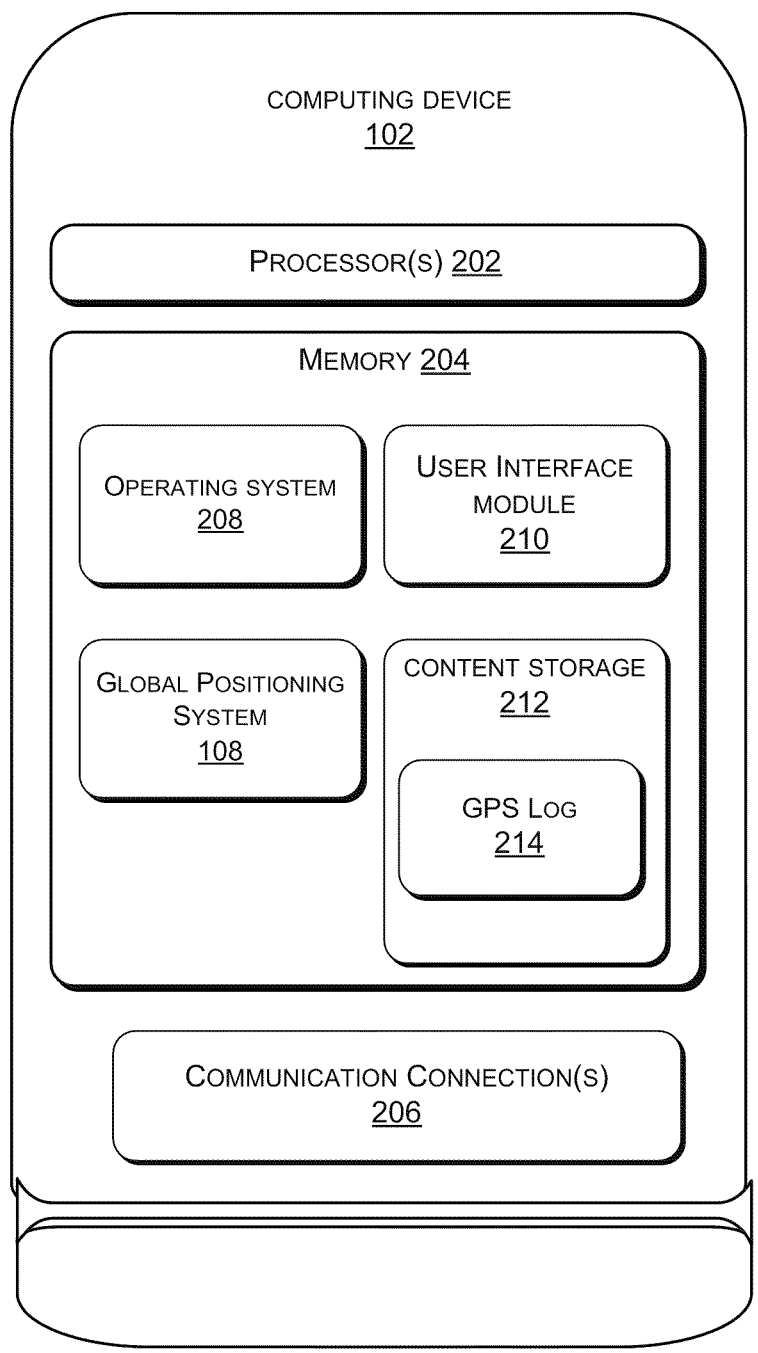
FIG. 2 is a block diagram of an exemplary computing device within the map-matching framework of FIG. 1.

FIG. 2 illustrates an exemplary computing device 102. The computing device 102 includes, without limitation, a processor 202, a memory 204, and one or more communication interfaces 206. An operating system 208, a user interface (UI) module 210, a global positioning system (GPS) 108, and content storage 212 are maintained in memory 204 and executed on processor 202.

When executed on the processor 202, the operating system 208 and UI module 210 collectively facilitate presentation of a user interface on a display of the computing device 102. GPS 108 may be implemented as a component of a web browser or a search engine, or may be implemented as an application in the computing device 102. As described above, the GPS 108 collects location data (e.g., GPS trajectories) over time as the computing device physically moves from one location to another. Content storage 212 provides local storage of sampling points and/or data received from map-matching module 114. For example, the sampling points and/or data received from the map-matching module may be stored in GPS log 214.

The communication interfaces 204 may include, without limitation, a wide area network (WAN) interface, a local area network interface (e.g., WiFi), a personal area network (e.g., Bluetooth) interface, and/or any other suitable communication interfaces to allow the computing device 102 to communicate over the network(s) 104.

The computing device 102, as described above, may be implemented in various types of system or networks. For example, the computing device may be a part of, without limitation, a client-server system, a peer-to-peer computer network, a distributed network, an enterprise architecture, a local area network, a wide area network, a virtual private network, a storage area network, and the like.

Figure 3:
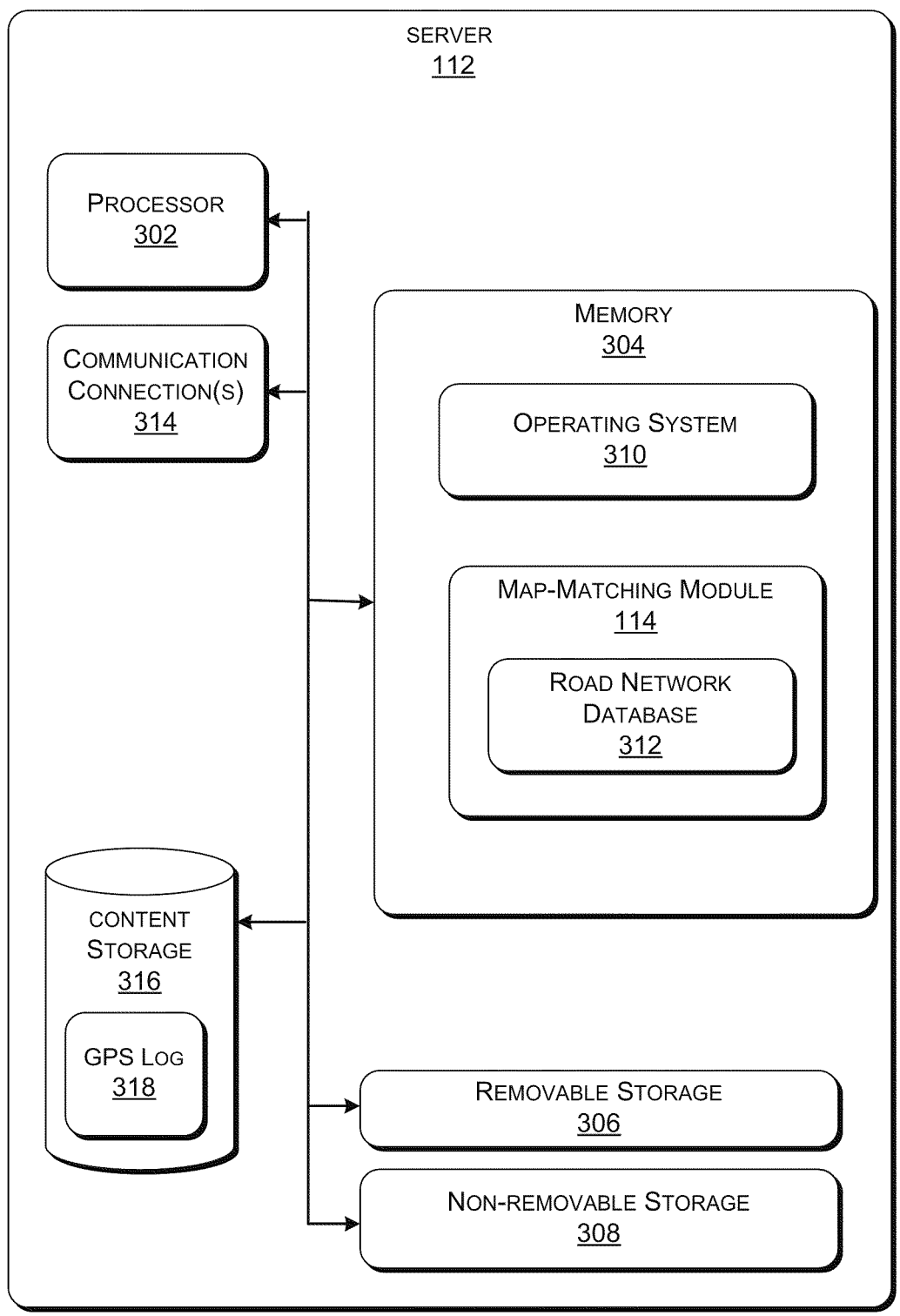
FIG. 3 is a block diagram of an exemplary server within the map-matching framework of FIG. 1.

FIG. 3 illustrates an exemplary server within the map-matching framework of FIG. 1. The illustrated exemplary server 112 includes, without limitation, processor 302, memory 304, removable storage 306 and/or non-removable storage 308, communication interface(s) 314, and content storage 316.

An operating system 310, and a map-matching module 114 are maintained in the memory 304 and executed on the processor 302. In an exemplary implementation, the map-matching module 114 includes a road network database 312 that includes, without limitation information pertaining to at least geographical locations within roadway system(s). For example, road network database 312 may contain a mapping system of the roadways of the greater Seattle area including, service roads, highways, and any other roads available to the user 106. Map-matching module 114 may also include databases of other types of information, including for example, rivers, railways, airports, restaurants, hotels, etc.

Communication interfaces 314, allow the processor 302 to communicate with the computing device 102, other network servers, network storage, and/or other devices over the network(s) 104, and content storage 316. Content storage 316 may store the GPS data collected by the GPS 108 and sent to the server 112. For example, the GPS data may be stored in GPS log 318. Although not shown in FIG. 3, the server 112 may also include one or more known input device(s), such as a keyboard, a mouse, a pen, a voice input device, a touch input device, and an output device such as a display, speaker, printer, or the like.

Any memory described herein may include volatile memory (such as RAM), nonvolatile memory, removable memory, and/or non-removable memory, implemented in any method or technology for storage of information, such as, computer-readable instructions, data structures, applications, program modules, emails, and/or other content. Also, any of the processors described herein may include onboard memory in addition to or instead of the memory shown in the figures. The memory may include storage media such as, but not limited to, random access memory (RAM), read only memory (ROM), flash memory, optical storage, magnetic disk storage or other storage devices, or any other medium which can be used to store the desired information and which can be accessed by the respective systems and devices.

Figure 4:
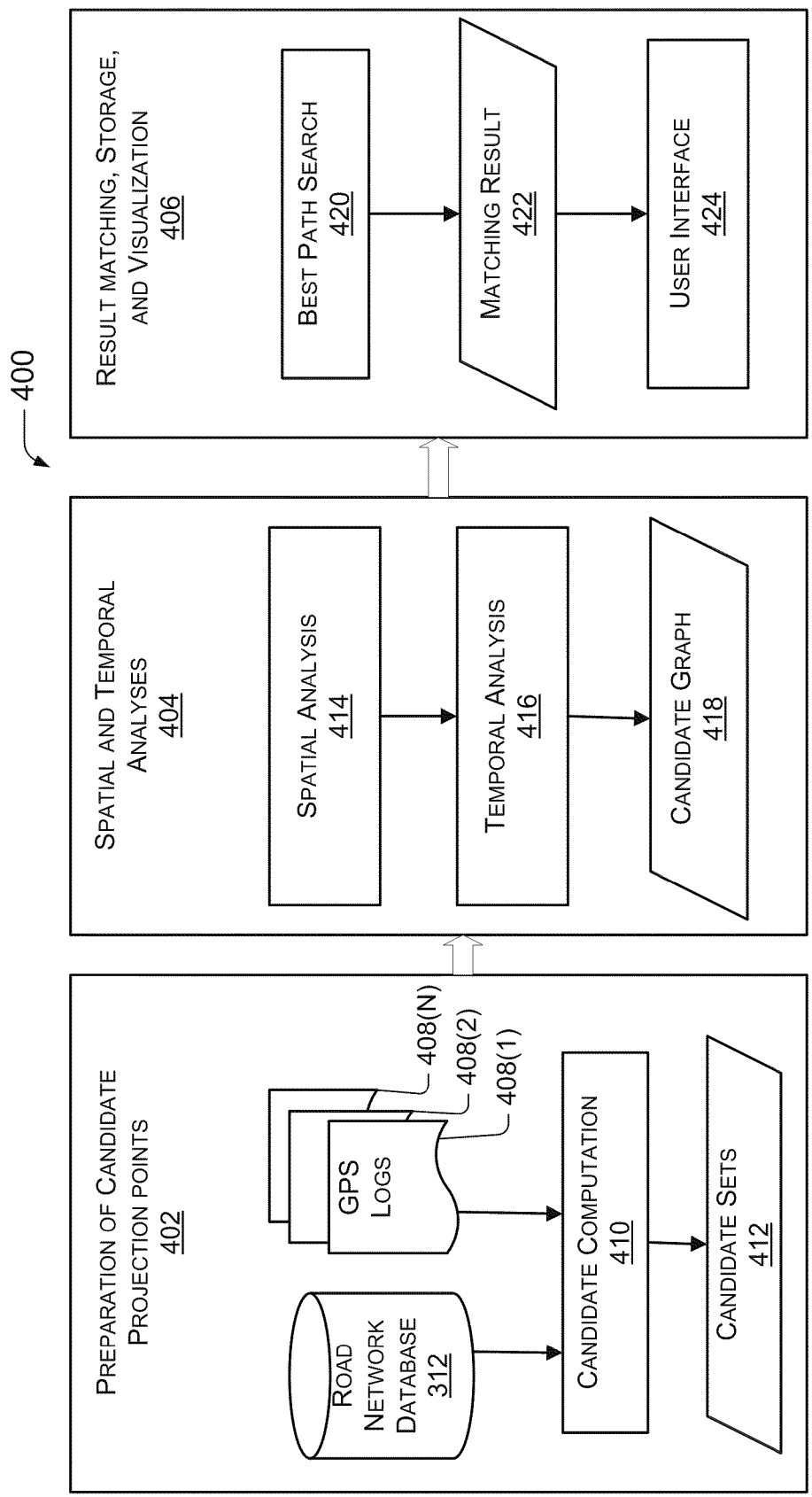
FIG. 4 is a flow chart of an exemplary map-matching process for determining a best-match trajectory.

FIG. 4 illustrates a process 400 for determining a best-match trajectory within the map-matching framework of FIG. 1. The map-matching framework of FIG. 1 enables the analysis of the data collected by the computing device to determine a preferred route from the starting location to the user desired destination.

The process 400 includes, without limitation, preparation of candidate projection points 402, spatial and temporal analyses 404, and result matching, storage, and visualization 406.

To prepare the candidate projection points, the map-matching module obtains data from GPS logs 408(1), 408(2), . . . , 408(N) and the road network database 312. A candidate computation 410 is then performed, the results of which are used to determine candidate sets 412. GPS logs 408 may correspond, for example, to GPS log 214 or GPS log 318 shown in FIG. 2 and FIG. 3, respectively.

Spatial and temporal analyses 404 are then performed. For example, a spatial analysis 414 and a temporal analysis 416 are performed on the candidate sets 412, resulting in a candidate graph 418.

The process concludes with result matching, storage, and visualization 406. For example, a best path search 420 is performed on the candidate graph 418 to determine a matching result 422. The matching result, or the preferred route, is presented to the user via a user interface 424.

Specific portions of process 400 are described below in greater detail with reference to FIG. 5-FIG. 9. However, it is to be appreciated that the description is not necessarily limited to the specific features or methods described.

Figure 5:
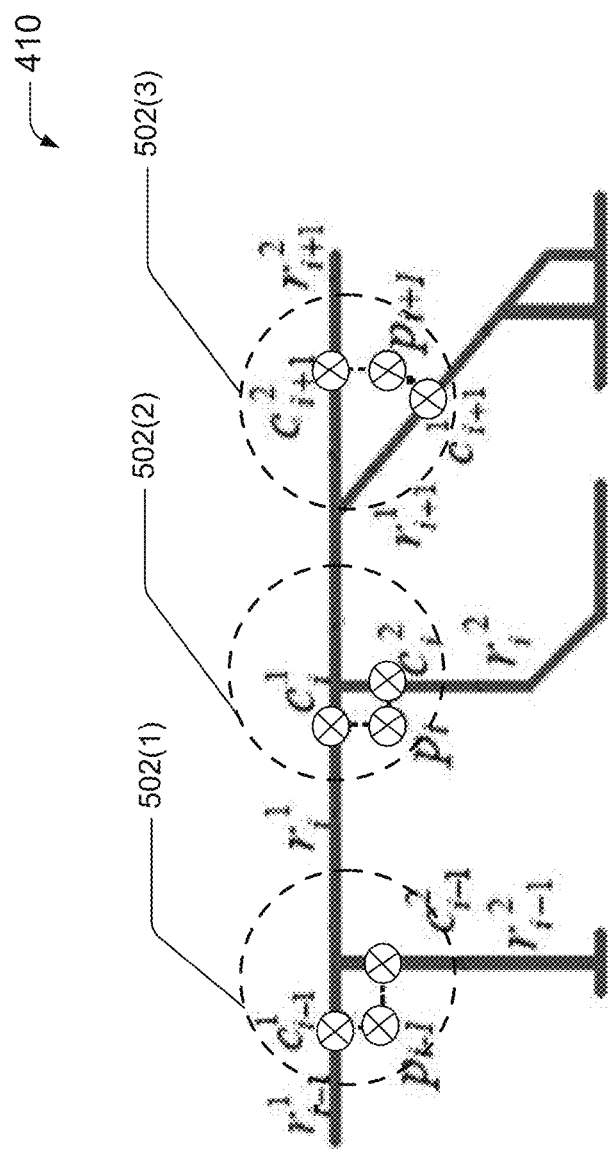
FIG. 5 is an illustration of exemplary sampling points mapped to sets of candidate projection points along mapped road segments.

FIG. 5 illustrates an exemplary candidate computation 410 portion of the process describe above with reference to FIG. 4. Referring back to FIG. 1 and FIG. 4, in an exemplary implementation, as the user 106 travels along the trajectory 110, raw GPS trajectory data, or sampling points, are automatically collected by computing device 102 and communicated to the map-matching module 114. The sampling points are taken at a low frequency, such as every 2 to 5 minutes, and are stored in GPS logs 408. As described above, GPS logs 408 may correspond to the GPS log 214 in the computing device 102 and/or the GPS log 318 in the server 112. Map-matching module 114 accesses the sampling points stored in the GPS log 408 to determine the best trajectory or route to get the user 106 from an identified starting location to a desired destination by first determining a set of candidate projection points corresponding to the sampling points stored in the GPS log 408. To determine the set of candidate projection points, map-matching module 114 utilizes a road network database 312 which, as discussed above, includes possible candidate road segments, or routes, available to the user 106. Using the information from the road network database 312 and GPS log 408, map-matching module 114 performs a candidate computation 404, an example of which is shown in FIG. 5.

Exemplary candidate computation 410 is determined by plotting one or more sampling points, $p_i$, along a determined candidate road segment. For each sampling point $p_i$, a circle 502 encompasses a set of candidate road segments supplied by road network database 312 within a given radius. In the example illustrated in FIG. 5, three sampling points are shown (i.e., $p_{i-1}$, $p_i$, and $p_{i+1}$). Focusing first on sampling point $p_{i-1}$, two candidate road segments (i.e., $r_{i-1}^1$ and $r_{i-1}^2$) lie within the circle 502(1) of $p_{i-1}$, indicating that the sampled point $p_{i+1}$ may correspond to a point on either road segment $r_{i-1}^1$ or road segment $r_{i-1}^2$. Utilizing this data, the map-matching module 114 determines at least one set of candidate projection points that lie along the candidate road segments $r_{i-1}^1$ and $r_{i-1}^2$. For example, as further shown in FIG. 5, the map-matching module 114 determines candidate projection points $c_{i-1}^1$ and $c_{i-1}^2$, corresponding to sampling point $p_{i-1}$.

Similarly, the map-matching module 114 also identifies candidate projection points $c_i^1$ and $c_i^2$ along candidate road segments $r_i^1$ and $r_i^2$, respectively, within the circle 502(2) encompassing sampling point $p_i$; and identifies candidate projection points $c_{i+1}^1$ and $c_{i+1}^2$ corresponding to sampling point $p_{i+1}$, where sampling point $p_{i+1}$ is encompassed by circle 502(3).

The result of the candidate computation 410 is, for each sampling point, a set of candidate projection points. Referring to the example shown in FIG. 5, the candidate computation 410 results in set $\{c_{i-1}^1, c_{i-1}^2\}$, corresponding to sampling point $p_{i-1}$; set $\{c_i^1, c_i^2\}$ corresponding to sampling point $p_i$; and set $\{c_{i+1}^1, c_{i+1}^2\}$ corresponding to sampling point $p_{i+1}$.

In an exemplary implementation, one or more indexing techniques may be used to expedite the generation of a set of candidate projection points. For example, indexing techniques that may be used include, without limitation, a space-partition based indexing method, such as the grid-based spatial index and the quad tree indexing structure, or a data driven indexing structure such as an R-tree indexing structure.

After determining the set of candidate projection points, as described above, the map-matching algorithm performs a spatial analysis 414 and a temporal analysis 416 to identify a particular candidate projection point within each set of candidate projection points that best matches the corresponding sampling point.

Exemplary spatial analysis 414 utilizes geometric and topological information from the road network database 312 to evaluate each of the determined candidate projection points. In one implementation, spatial analysis 414 includes two components, an observation probability component and a transmission probability component.

The observation probability component represents the likelihood that a trajectory, or route, supplied from the map-matching module 114 to the user 106 is the best route based upon the distance between two candidate points, such as candidate points $c_i^1$ and $c_i^2$. However, because no additional information is taken into account the result typically includes an error.

The error in the observation probability is calculated as a normal distribution N ($\mu$, $\sigma^2$) using the distance between sampling point $p_i$ and candidate point $c_i^j$. The normal distribution demonstrates how likely the trajectory supplied from the map-matching module 114 would have been if the user 106 had actually been on a road with a location $c_i^j$ and without considering any previous points. Accordingly, the observation probability is calculated according to:

$$N(c_i^j) = \frac{1}{\sqrt{2\pi}\,\sigma} e^{-\frac{(x_i^j-\mu)^2}{2\sigma^2}} \qquad \text{Equation (1)}$$

where x is the distance between the sampling point $p_i$ and its corresponding candidate point $c_i^j$, represented as $x_i^j = \text{dist}(c_i^j, p_i)$. In one implementation, a zero-mean normal distribution with a standard deviation of about 66 feet (or about 20 meters) may be used. Alternatively, any normal distribution with a suitable standard deviation may be used.

It is assumed that a typical user 106 would desire the shortest and most direct route to a destination. Therefore, in one implementation, Equation (1) corresponds to a shortest path computation. A variety of shortest path algorithms may be used to compute the shortest path.

Figure 6:
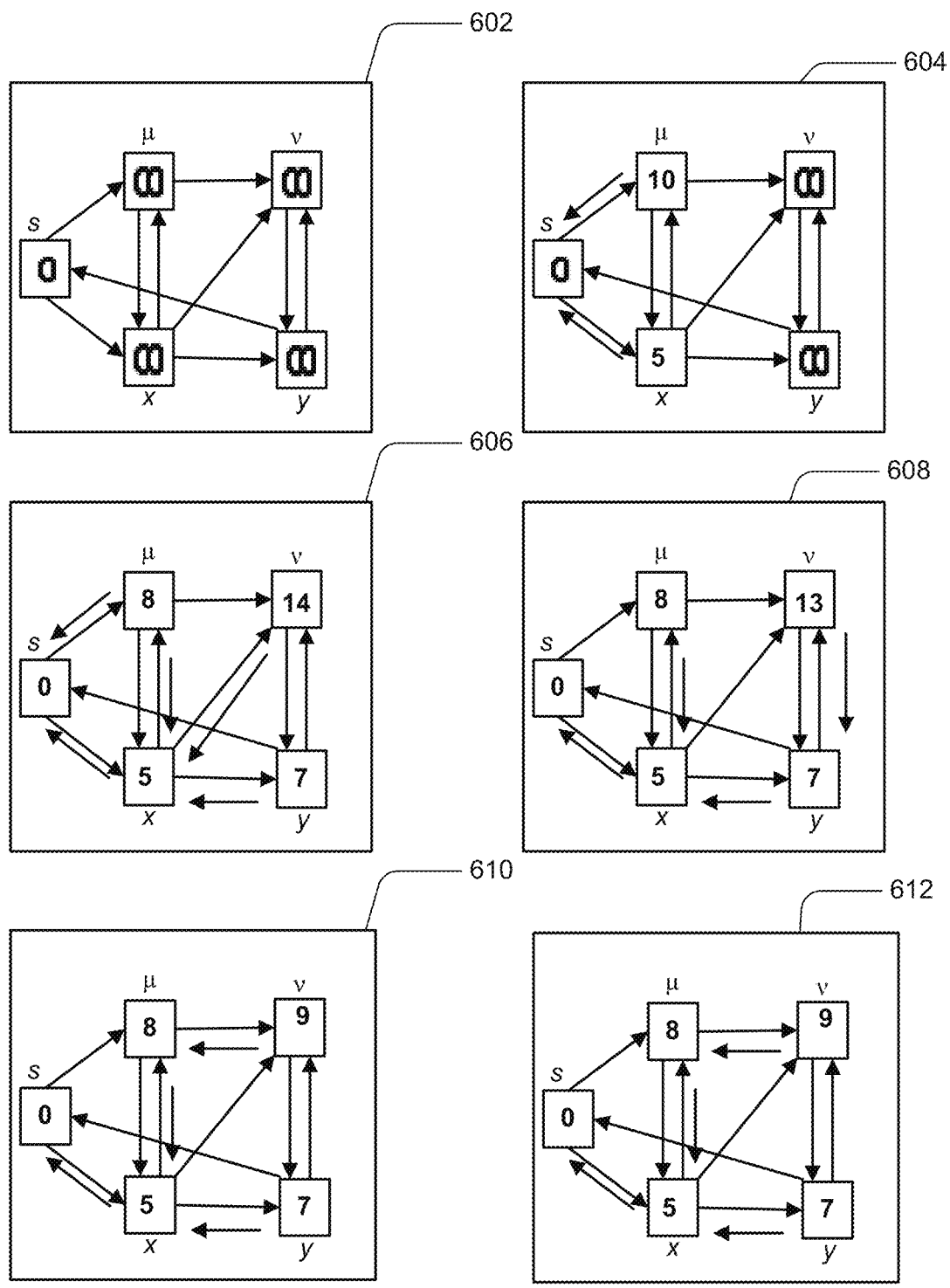
FIG. 6 is an illustrative shortest path computation.

FIG. 6 illustrates an exemplary shortest path computation utilizing a Dijkstra's shortest path algorithm. Steps 602, 604, 606, 608, 610, and 612, illustrate typical steps of a Dijkstra's computation. An example Dijkstra's algorithm is:

```
1.  INITIALIZE SINGLE-SOURCE (G, s)
2.  S ← { } // S will ultimately contains vertices of final shortest-path
    weights from s
3.  Initialize priority queue Q i.e., Q ← V[G]
4.  while priority queue Q is not empty do
5.      u← EXTRACT_MIN(Q) // Pull out new vertex
6.      S← S ∪ {u}
        // Perform relaxation for each vertex v adjacent to u
7.      for each vertex v in Adj[u] do
8.          Relax (u,v,w)
``` where G represents a candidate graph, s represents a source vertex or source sampling point, Q is a set of candidate projection points, and a vertex represents sampling points other than the source sampling point. A tree T is built that spans all reachable vertices from a point S. Vertices are added to the tree T in order of the distance between the source sampling point and the remaining sampling points. For example, a first distance S, then a vertex closest to S, and so on.

As described above, an exemplary spatial analysis 414 has an observation probability component and a transmission probability component. The example Dijkstra's algorithm described above results in an observation probability.

The transmission probability for candidate points $c_{i-1}^t$ to $c_i^s$ for two neighboring sampling points $p_{i-1}$ and $p_i$ respectively, is the likelihood that the "true" path from $p_{i-1}$ and $p_i$ follows the shortest path from $c_{i-1}^t$ to $c_i^s$. Such a true path is represented by:

$$V(c_{i-1}^t \to c_i^s) = \frac{d_{i-1 \to i}}{w_{(i-1,t) \to (i,s)}} \qquad \text{Equation (2)}$$

where $d_{i-1 \to 1}=\text{dist}(p_i, p_{i-1})$ is the Euclidean distance between $p_i$ and $p_{i-1}$, and $w_{(i-1,t) \to (i,s)}$ is the length of the shortest path from $c_{i-1}^t$ to $c_i^s$.

The product of the observation probability and the transmission probability reflect the likelihood that the user 106 will move from $c_{i-1}^t$ to $c_i^s$. Combining the observation probability and the transmission probability, an exemplary spatial analysis function is:

$$F_s(c_{i-1}^t \to c_i^s) = N(c_i^s) * V(c_{i-1}^t \to c_i^s), 2 \le i \le n \qquad \text{Equation (3)}$$

where $c_{i-1}^t$ and $c_i^s$ may be any two candidate points for two neighboring sampling points $p_{i-1}$ and $p_i$. The spatial analysis 414 for a candidate $p_i$ will differ depending upon the previous candidate point.

Figure 7:
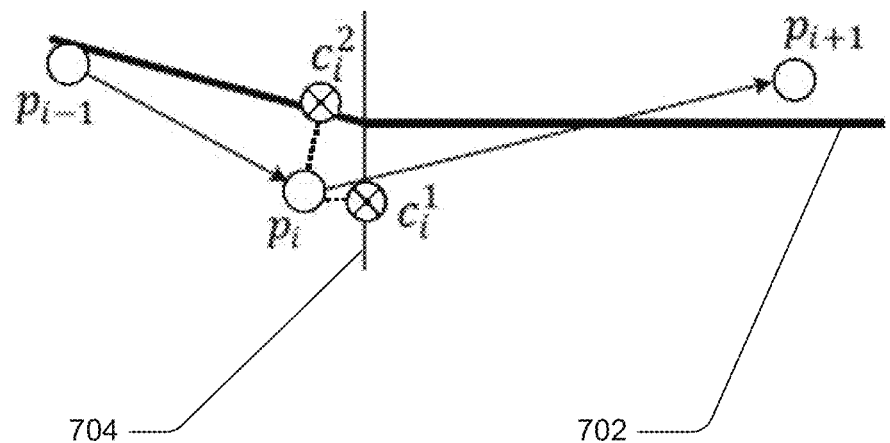
FIG. 7 is a further illustration of the spatial-temporal analysis of FIG. 4.

As previously discussed, map-matching based on spatial analysis alone, typically leads to poor accuracy when determining a best trajectory or route. For example, as illustrated in FIG. 7, a bold line 702 represents a highway, and a thin line 704 represents a service road. Just looking at sampling point $p_i$, it is difficult to determine from which road sampling point $p_i$ was most likely sampled. In this example, although $p_i$ appears closer to the service road 704, the neighboring point's $p_{i-1}$ and $p_{i+1}$ are closer to the highway, which may suggest that $p_i$ was more likely sampled from a location on the highway than a location on the service road. This example illustrates the potential for errors when performing map-matching based solely on spatial analysis.

Analyzing speed information in addition to the location information can increase the accuracy of the map-matching. In the example shown in FIG. 7, because the service road 704 and highway 702 are located in close proximity to one another, whether $p_i$ is on the highway or the service road, the candidate points $c_i^1$ and $c_i^2$ have similar spatial measurements. However, if the average speed of the user 106 is calculated over a time interval Δt, a speed indicting a highway or a service road may be determined, enabling a more accurate result when determining the best trajectory or route for the user. For example, if a typical service road has a speed limit of 30 miles per hour (mph), and over the time interval, an average speed of 65 (mph) is calculated, then it would be more reasonable to map sampling point $p_i$ to the candidate projection point $c_i^2$ on the highway.

Therefore, an exemplary temporal analysis 416 is based upon an average speed between two candidate points $c_{i-1}^t$ and $c_i^s$ corresponding to two neighboring sampling points, $p_{i-1}$ and $p_i$, respectively. The average speed $\bar{v}_{(i-1,t) \to (i,s)}$ is calculated using the formula:

$$\bar{v}_{(i-1,t) \to (i,s)} = \frac{\sum_{u=1}^{k} l_u}{\Delta t_{i-1 \to i}}. \qquad \text{Equation (4)}$$

where $l_u = e'_u * 1$ is the length of road segment $e'_u$, and $\Delta t_{i-1 \to i} = p_i * t - p_{i-1} * t$ is the time interval between the two sampling points $p_i$ and $p_{i-1}$. In an exemplary implementation, each road segment $e'_u$ is also associated with a typical speed value $e'_u * v$, and a cosine distance may be used to measure the similarity between the actual average speed from $c_{i-1}^t$ to $c_i^s$ and the speed constraints (e.g., known speed limits) of the path. Alternatively, any suitable measurement may be used to determine the similarity. Considering a vector k with elements of the same value $\bar{v}_{(i-1,t) \to (i,s)}$ and the vector $(e'_1 v, e'_2 1 v, \ldots, e'_k v)^T$, an exemplary temporal analysis function is calculated as:

$$F_t(c_{i-1}^t \to c_i^s) = \frac{\sum_{u=1}^{k} (e'_u \cdot v \times \bar{v}_{(i-1,t) \to (i,s)})}{\sqrt{\sum_{u=1}^{k} (e'_u \cdot v)^2} \times \sqrt{\sum_{u=1}^{k} \bar{v}_{(i-1,t) \to (i,s)}^2}} \qquad \text{Equation (5)}$$

Combining Equation (3) and Equation (5), as set forth above, the spatial-temporal (ST) function for $c_{i-1}^t \to c_i^s$ is:

$$F(c_{i-1}^t \to c_i^s) = F_s(c_{i-1}^t \to c_i^s) * F_t(c_{i-1}^t \to c_i^s), 2 \le i \le n \qquad \text{Equation (6)}$$

Referring back to the process illustrated in FIG. 4, a candidate graph 418 is created using candidate projection points determined during the spatial analysis 414 and the temporal analysis 416 calculations. The candidate graph 418 illustrates the possible trajectories or routes available to the user 106 and is used to perform a best path search 420.

Figure 8:
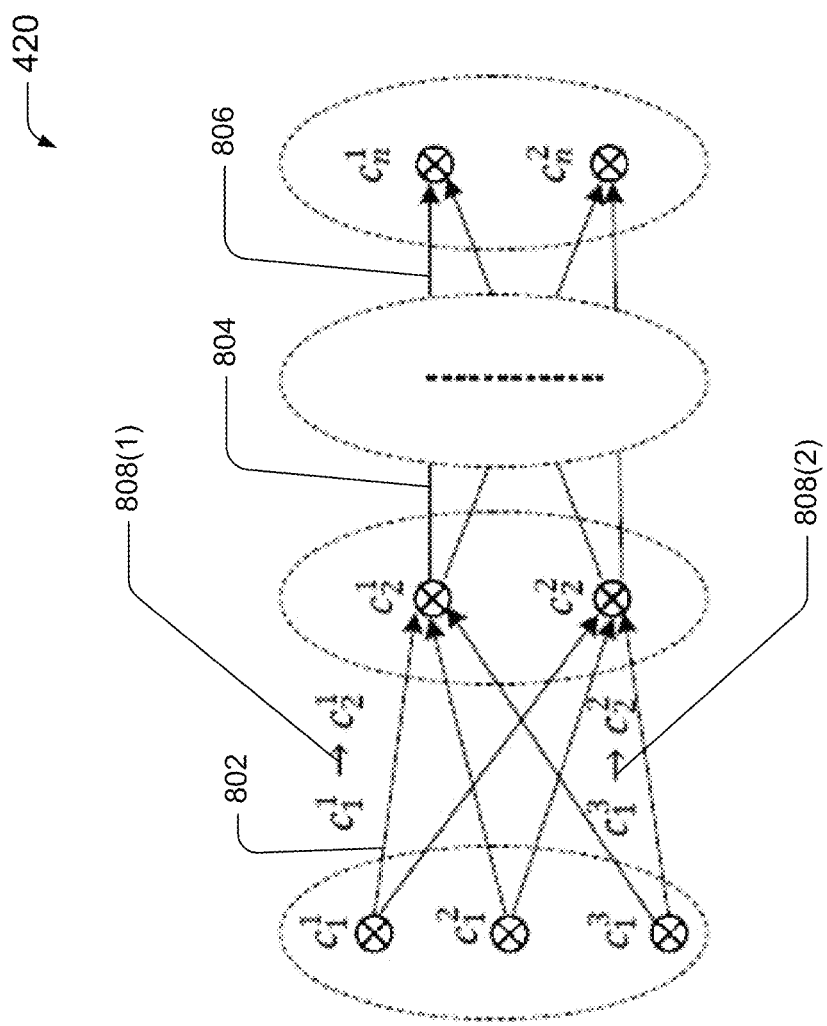
FIG. 8 is an illustrative candidate graph within the map-matching framework of FIG. 1.

FIG. 8 illustrates an exemplary best path search 420. For example, FIG. 8 illustrates an exemplary candidate graph $G'_T(P'_T, E'_T)$ for a trajectory $T: p_1 \to p_2 \to p_n$, where $V'_T$ is a set of candidate points corresponding to each of a set of received sampling points, and $E'_T$ is a set of edges representing the shortest paths between any two neighboring candidate points.

The candidate path search 420 may include $c_1^{s1} \to c_2^{s2} \to \ldots c_n^{sn}$, for example, 802→804→806.

To determine which candidate path sequence is a best match trajectory or route 422 corresponding to the sample points input by the user 106 or collected by the GPS 108, a score for each of the candidate path sequences is calculated. For example, scores for candidate path sequences 808(1) and 808(2) may be calculated and compared to determine which of the two candidate path sequences has the highest score, and is therefore the best match for the sampling points along the trajectory. In an exemplary implementation, the score for such a candidate sequence path is given by:

$$F(P_c) = \Sigma_{i=2}^n F(c_{i-1}^{si-1} \to c_i^{si})$$  Equation (7)

The best-match path P for a trajectory T may be selected using:

$$P = \arg\max_{P_c} F(P_c), \forall P_c \in G'_T(V'_T, E'_T)$$  Equation (8)

Algorithm 1, set forth below, outlines an exemplary algorithm for a spatial and temporal analysis 404 using the map-matching module 114. Algorithm 1 includes the terms and equations described above in FIGS. 1-7 and Equations 1-6. According to Algorithm 1, a set of candidate points for each sampling point along a Trajectory T (for example, the sampling points found in the GPS logs 408) is calculated. A candidate graph is constructed based upon the spatial and temporal analyses, followed by a report identifying the path sequence P with the highest ST-function value from $G'_T$. The result is sent to Algorithm 2.

---
Algorithm 1 Map-Matching Algorithm
---

Input: Road Network G, a list of GPS points $p_1, p_2,\ldots,p_n$
Output: The matched sequence $c_{1,j1}, c_{2,j2},\ldots,c_{n,jn}$
1: Initialize tList as an empty list; // a list of sets of candidates
2: for I = 1 to n do
3:     s = GetCandidates(pi, G, r); // candidates within radius r
4: tList.add(s);
5: G' = ConstructGraph(tList); // constructs graph G'
6: RETURN FindMatchedSequence (G')

---

Algorithm 2, set forth below, outlines an exemplary algorithm for result matching, storage and visualization 406 based upon the results of Algorithm 1. Algorithm 2 determines the trajectory or route most likely to correspond to the received sampling points.

---
Algorithm 2 FindMatchedSequence
---

Input: Candidate graph G'
Output: The matched sequence $c_{1,j1}, c_{2,j2},\ldots,c_{n,jn}$
1: Let f[ ] denote the highest score found so far;
2: Let pre[ ] denote the parent of current candidate;
3: for each $c_{l,s}$ do
4:     $f[c_{l,s}] = F_s(c_{l,s})$;
5: for i = 2 to n do
6:     for each $c_{l,s}$ do
7:         max = -∞;
8:         for each $c_{i-1,t}$ do
9:             alt = f $[c_{i-1,t}]$ + $F_s(c_{l,s})$ * $F_t$ ($P_{ci-1,t \text{ to } cl,s}$);
10:            if (alt>max) then
11:                max = alt;
12:                pre$[c_{l,s}] = c_{i-1,t}$;
13:        $f[c_{l,s}]$ = max;
14: Initialize rList as an empty list;
15: p = maxarg$_{cn,s}$(f$[c_{n,s}]$);
16: for I = n downto 1 do ---
Algorithm 2 FindMatchedSequence
---

17:     rList.add(p);
18:     p = pre[p];
19: return rList.reverse90;

---

The exemplary ST-matching strategy represented by Algorithm 1 and Algorithm 2 is based upon a global algorithm, meaning the best path sequence is computed based upon an overall score for the entire trajectory of the candidate path sequence. However, if a trajectory has too many sampling points (i.e., n is very large) map-matching module 114 may use a local algorithm, based on a subset of the sampling points, to determine a matching result 422.

Figure 9:
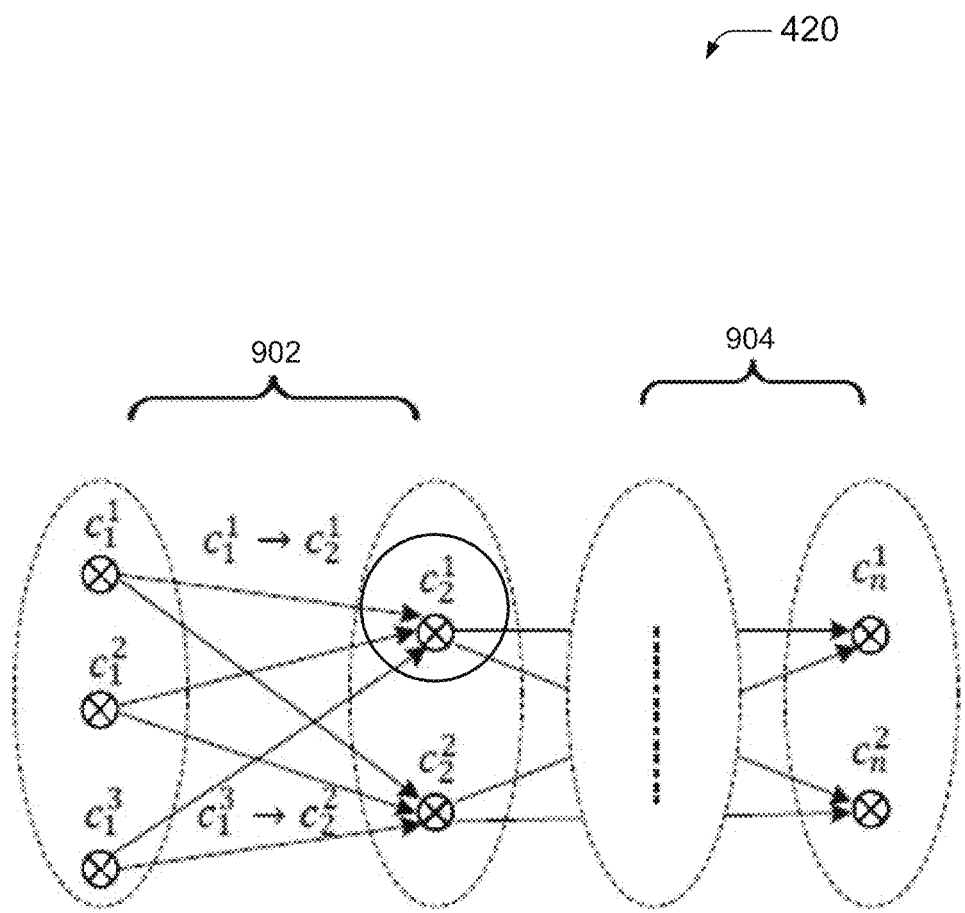
FIG. 9 is an illustrative local spatial-temporal matching strategy.

FIG. 9 illustrates an exemplary best path search 420 using a local algorithm. As illustrated in FIG. 9, each partial candidate graph 902 and 904 is constructed from a trajectory T. A best matching sequence is determined for each partial candidate graph similar to the global algorithm approach set forth above. The process is repeated for each partial candidate graph to determine a matching result 422.

Figure 10:
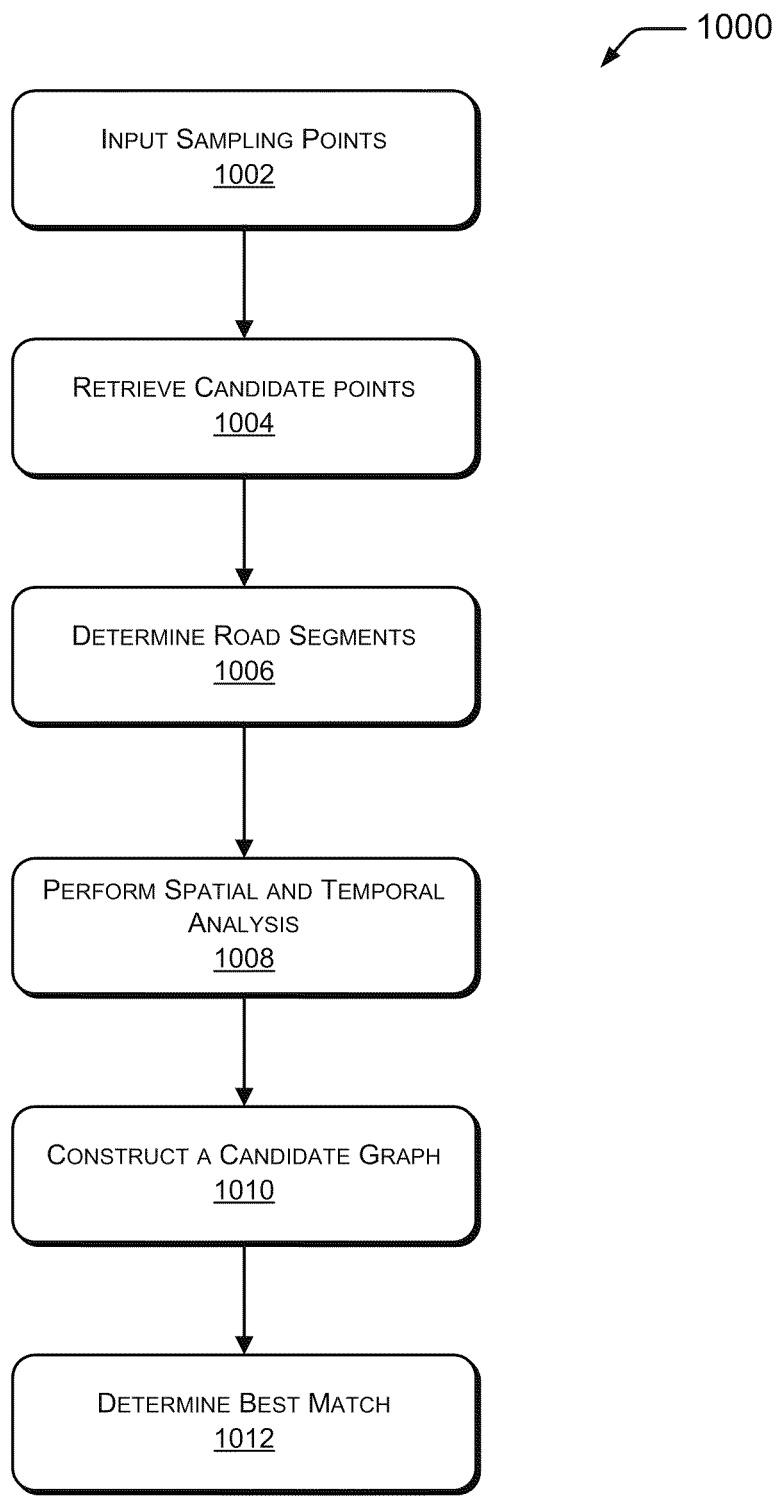
FIG. 10 is an illustrative process flow of the map-matching framework of FIG. 1.

FIG. 10 illustrates an exemplary method outlining the map-matching procedure set forth above. At block 1002, a set of sampling points are collected by GPS 108 on computing device 102. The sampling points are communicated from the computing device 102 to the map-matching module 114 over network 104. At block 1004 map-matching module 114 generates a set of candidate projection points corresponding to each sampling point. For example, a for every $p_1$, a set of candidate points may include $c_1^1$, $c_1^2$, and $c_1^3$. Using these candidate points, map-matching module 114 may access a road network database at block 1006 to determine one or more corresponding road segments. At block 1008, map-matching module 114 may perform a spatial analysis and a temporal analysis using the set of candidate points. For example, an observation measurement, a transmission measurement, and a temporal measurement are illustrated in Tables 1 and 2, respectively, shown in FIG. 11.

Figure 11:
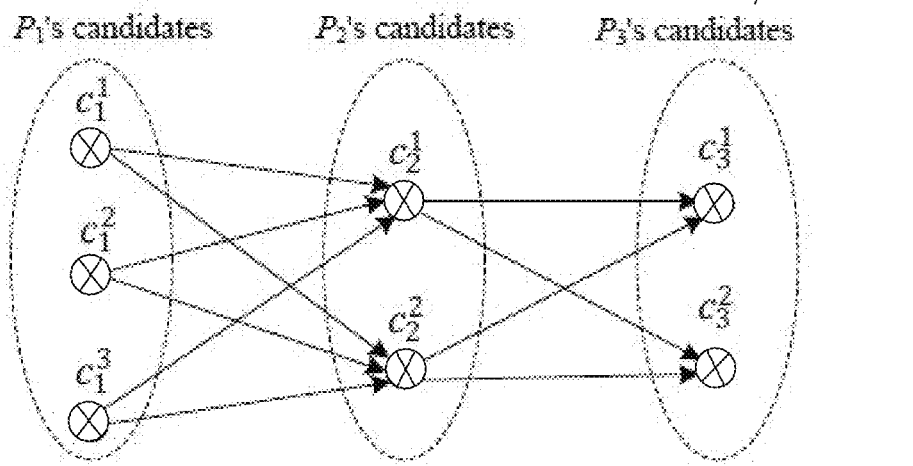
FIG. 11 is an illustrative example of the map-matching framework of FIG. 1.

At block 1010 a candidate graph may be constructed. For example, a candidate graph 1106, may be created corresponding to those measurements set forth in Tables 1 and 2, 1102 and 1104 of FIG. 11. At block 1012 map—matching module may determine a best match trajectory for the sampling points input by GPS 108. For example, map-matching module 114 may use Algorithms 1 and 2, described above, to ascertain which candidate point has the highest overall score, and therefore is the best match to the sampling points. For example, Table 3, 1108, illustrated in FIG. 11, shows $c_3^2$ having the highest overall score for candidate graph 1106. Therefore, $c_3^2$ may be chosen as the matching result for $p_3$, and therefore, the best match trajectory is most likely $$c_1^1 \to c_2^2 \to c_3^2.$$

Conclusion

Although map-matching for low-sampling rate GPS trajectories has been described in language specific to structural features and/or methods, it is to be understood that the subject of the appended claims are not necessarily limited to the specific features or methods described. Rather, the specific features and methods are disclosed as exemplary implementations.

What is claimed is:

1. A computer-implemented method comprising:
   collecting, from a global positioning system (GPS) of a computing device, GPS location data comprising a plurality of sampling points each corresponding to a location of the computing device;
   receiving a GPS trajectory comprising the plurality of sampling points;
   determining a first set of candidate projection points for a first sampling point of the plurality of sampling points corresponding to a first location of the computing device based on a first geometric shape that encompasses the first sampling point;
   determining a second set of candidate projection points for a second sampling point of the plurality of sampling points corresponding to a second location of the computing device based on a second geometric shape that encompasses the second sampling point, wherein at least one of the first set of candidate projection points or the second set of candidate projection points comprises two or more candidate projection points;
   performing a spatial analysis and a temporal analysis on the first set of candidate projection points, wherein the temporal analysis for a first pair of candidate projection points with one candidate projection point from the first set and one candidate projection point from the second set is based upon an average speed determined between the first sampling point of the plurality of sampling points corresponding to the first location of the computing device and the second sampling point of the plurality of sampling points corresponding to the second location of the computing device, and a speed constraint value of a road segment associated with one of the candidate projection points of the first pair of candidate projection points;
   constructing a candidate graph based upon results of the spatial analysis and the temporal analysis, the candidate graph including more than one path between the candidate projection points of the first set and the candidate projection points of the second set;
   evaluating the paths of the candidate graph to determine a preferred path between the candidate projection points of the first set and the candidate projection points of the second set; and
   causing the preferred path between the candidate projection points of the first set and the candidate projection points of the second set to be presented at a graphical user interface.

2. The method of claim 1, wherein performing the spatial analysis comprises:
   determining an observation probability for at least candidate projection points for two neighboring sampling points;
   determining a transmission probability for the candidate points for the neighboring sampling points; and
   multiplying the observation probability by the transmission probability to produce a likelihood that the computing device will move from a candidate projection point associated with the first of the neighboring sampling points to a candidate projection point associated with the second of the neighboring sampling points.

3. The method of claim 2, wherein the observation probability is calculated according to a distance between the first sampling point and the candidate projection points in the first set.

4. The method of claim 2, wherein the transmission probability is calculated according to a plurality of candidate projection points and the corresponding plurality of sampling points, such that a distance between the plurality of sampling points follows the shortest path from a first candidate projection point to a second candidate projection point.

5. The method of claim 1 further comprising presenting the preferred path on a display associated with the computing device.

6. The method of claim 1, wherein the determining of the first set of candidate projection points and the determining of the second set of candidate projection points are performed by a built-in grid-based spatial index method.

7. The method of claim 1, wherein the evaluating the paths of the candidate graph is based upon an overall score for a candidate sequence path, wherein the overall score indicates a probability that the candidate sequence path is the preferred path.

8. The method of claim 1, wherein the plurality of sampling points comprises data gathered by a GPS based upon a pre-determined, low-frequency sampling interval.

9. The method of claim 8, wherein the low-frequency sampling interval comprises every 2 minutes, every 3 minutes, every 4 minutes, every 5 minutes, or a time period greater than every 5 minutes.

10. One or more computing devices, comprising:
    one or more processors;
    a memory coupled to the one or more processors; and
    a map-matching module stored in the memory and executed on the processor to:
    receive a plurality of sampling points collected from a global positioning system of a computing device along a computing device-travelled trajectory, each of the plurality of sampling points corresponding to a location of the computing device;
    determine a first set of candidate projection points for a first sampling point of the plurality of sampling points corresponding to a first location of the computing device based on a predefined a first geometric shape that encompasses the first sampling point;
    determine a second set of candidate projection points for a second sampling point of the plurality of sampling points corresponding to a second location of the computing device based on a second geometric shape that encompasses the second one of the sampling points, wherein at least one of the first set of candidate projection points or the second sets of candidate projection points comprises two or more candidate projection points;
    determine a trajectory corresponding to the first sampling point and second sampling point based upon a spatial-temporal analysis and at least the first set of candidate projection points and second set of candidate projection points, wherein the spatial-temporal analysis for a first pair of candidate projection points with one candidate projection point from the first set and one candidate projection point from the second set is based at least upon an average speed determined between the first sampling point of the plurality of sampling points corresponding to the first location of the computing device and the second sampling point of the plurality of sampling points corresponding to the second location of the computing device, and a speed constraint value of a road segment associated with the candidate projection points of the first pair of candidate projection points; and cause the trajectory corresponding to the first sampling point and second sampling point to be displayed at a graphical user interface.

11. The one or more computing devices of claim 10, wherein the sampling points are collected at a pre-determined, low-frequency sampling interval.

12. The one or more computing devices of claim 11, wherein the low-frequency sampling interval comprises every 2 minutes, every 3 minutes, every 4 minutes, every 5 minutes, or a time period greater than every 5 minutes.

13. The one or more computing devices of claim 10, wherein a candidate path sequence is a result of the spatial-temporal analysis and is the best match trajectory corresponding to the one or more sampling points.

14. The one or more computing devices of claim 12, wherein the pre-determined sampling interval is defined by a user.

15. The one or more computing devices of claim 10, wherein the best match trajectory is further based upon a candidate set comprising a plurality of the candidate projection points.

16. The one or more computing devices of claim 15, wherein the spatial-temporal analysis employs a road network database comprising geometric information and topological information to evaluate the plurality of candidate projection points.

17. One or more computer-readable devices storing computer-executable instructions that, when executed on one or more processors, perform operations comprising:
    collecting, from a global positioning system of a computing device, GPS location data comprising a plurality of sampling points each corresponding to a location of the computing device:
    performing a spatial-temporal analysis on a plurality of candidate projection points, the plurality of candidate projection points corresponding to the plurality of sampling points collected along a computing device-travelled trajectory, wherein a first pair of the candidate projection points are selected based on a geometric shape that encompasses an associated one of the plurality of sampling points, wherein the spatial-temporal analysis is based upon an average speed determined between at least two consecutive sampling points of the plurality of sampling points corresponding to at least two consecutive locations of the computing device, and a speed constraint value of a road segment associated with one of the candidate projection points of the first pair of the candidate projection points;
    constructing a candidate graph having a plurality of candidate sequence paths based upon the plurality of candidate projection points;
    evaluating the candidate graph to determine a trajectory based on the plurality of candidate sequence paths; and
    causing the trajectory to be displayed at a graphical user interface.

18. The one or more computer-readable devices of claim 17, wherein the plurality of sampling points are gathered during a pre-defined low-frequency sampling interval.

19. The one or more computer-readable devices of claim 17, wherein the candidate graph comprises one or more partial candidate graphs.

20. The one or more computer-readable devices of claim 17, wherein the evaluating comprises calculating a score for individual ones of the plurality of candidate sequence paths based at least in part on the spatial-temporal analysis, and
    wherein the trajectory is determined based on the scores for the individual ones of the plurality of candidate sequence paths.

* * * * *